(12) United States Patent
Smith et al.

(10) Patent No.: US 11,625,506 B1
(45) Date of Patent: Apr. 11, 2023

(54) SECURE ENCLOSURE FOR DEVICES USED TO TEST REMOTE CONNECTIVITY

(71) Applicant: HEADSPIN, INC., Palo Alto, CA (US)

(72) Inventors: Severin Smith, Toronto (CA); Brien Colwell, Redwood City, CA (US); Manish Lachwani, Los Altos, CA (US)

(73) Assignee: HEADSPIN, INC., Palo Alto, CA (US)

( * ) Notice: Subject to any disclaimer, the term of this patent is extended or adjusted under 35 U.S.C. 154(b) by 615 days.

(21) Appl. No.: 16/593,847

(22) Filed: Oct. 4, 2019

Related U.S. Application Data

(63) Continuation-in-part of application No. 15/783,859, filed on Oct. 13, 2017, now abandoned.
(Continued)

(51) Int. Cl.
| | |
|---|---|
| G07F 19/00 | (2006.01) |
| G06F 21/87 | (2013.01) |
| G06F 3/044 | (2006.01) |
| H04L 9/40 | (2022.01) |
| H05K 5/02 | (2006.01) |
| H04W 12/08 | (2021.01) |
| H04W 4/80 | (2018.01) |
| G07C 9/32 | (2020.01) |

(Continued)

(52) U.S. Cl.
CPC ............ *G06F 21/87* (2013.01); *G06F 3/0447* (2019.05); *G06F 21/86* (2013.01); *G07C 9/32* (2020.01); *H04L 63/10* (2013.01); *H04W 4/80* (2018.02); *H04W 12/08* (2013.01); *H04W 12/30* (2021.01); *H05K 5/0221* (2013.01); *H05K 5/0247* (2013.01); *G06F 2200/1633* (2013.01); *G06F 2221/2143* (2013.01)

(58) Field of Classification Search
CPC ......... H04L 63/10; G06F 21/604; G06F 21/62
See application file for complete search history.

(56) References Cited

U.S. PATENT DOCUMENTS

| | | |
|---|---|---|
| 8,175,538 B1 | 5/2012 | Chen et al. |
| 8,621,091 B1 | 12/2013 | Akalin et al. |

(Continued)

OTHER PUBLICATIONS

Krueger, Kent K., "Notice of Allowance dated Jun. 11, 2021", U.S. Appl. No. 16/533,210, The United States Patent and Trademark Office, dated Jun. 11, 2021.

(Continued)

*Primary Examiner* — Ellen Tran
(74) *Attorney, Agent, or Firm* — Lindauer Law, PLLC

(57) ABSTRACT

Mobile devices executing applications may be tested for networking issues by utilizing a test network having proxy access devices placed at different physical locations. Devices may be stored in a secure enclosure that includes a host device. The enclosure includes access controls to prevent unauthorized removal of devices or access to stored data. If an unauthorized access, disconnection from the host device, or disconnection of a device from a power source is detected, devices may be placed into a locked state or data on the devices may be deleted. The enclosure may also include a control device for testing the exchange of Bluetooth data by the devices. The enclosure may also include conductive members placed on the touch sensors of devices for providing simulated touch input to the touch sensors by changing the capacitance of adjacent regions of the touch sensors.

20 Claims, 19 Drawing Sheets

Related U.S. Application Data

(60) Provisional application No. 62/409,810, filed on Oct. 18, 2016.

(51) Int. Cl.
*H04W 12/30* (2021.01)
*G06F 21/86* (2013.01)

(56) References Cited

U.S. PATENT DOCUMENTS

| | | |
|---|---|---|
| 9,170,922 B1 | 10/2015 | Lachwani et al. |
| 9,356,883 B1 | 5/2016 | Borthakur |
| 9,660,895 B1 | 5/2017 | Bennett |
| 9,681,318 B1 | 6/2017 | Lachwani et al. |
| 9,749,888 B1 | 8/2017 | Colwell et al. |
| 2001/0049263 A1 | 12/2001 | Zhang |
| 2004/0060056 A1 | 3/2004 | Wellons et al. |
| 2005/0114706 A1 | 5/2005 | DeStefano et al. |
| 2006/0195894 A1 | 8/2006 | Nita et al. |
| 2006/0293777 A1 | 12/2006 | Breitgand et al. |
| 2007/0055476 A1 | 3/2007 | Whisnant et al. |
| 2007/0094356 A1 | 4/2007 | Sethi et al. |
| 2007/0121674 A1 | 5/2007 | Chen et al. |
| 2008/0298367 A1 | 12/2008 | Furukawa |
| 2010/0094990 A1 | 4/2010 | Ben-Yehuda et al. |
| 2011/0090939 A1 | 4/2011 | Diener et al. |
| 2011/0151864 A1 | 6/2011 | Byun et al. |
| 2012/0158908 A1 | 6/2012 | Luna et al. |
| 2013/0074048 A1 | 3/2013 | Osawa et al. |
| 2014/0040628 A1 | 2/2014 | Fort et al. |
| 2014/0113625 A1 | 4/2014 | Gruber et al. |
| 2014/0217169 A1* | 8/2014 | Lewis ............ G06Q 20/3274 235/379 |
| 2014/0359139 A1 | 12/2014 | Efrati et al. |
| 2015/0208258 A1 | 7/2015 | Brenzel et al. |
| 2015/0319048 A1 | 11/2015 | Griff et al. |
| 2015/0370304 A1 | 12/2015 | Salah et al. |
| 2016/0133231 A1 | 5/2016 | Liu et al. |
| 2016/0205720 A1 | 7/2016 | Mandanapu |
| 2016/0254967 A1 | 9/2016 | Brown et al. |
| 2016/0267930 A1 | 9/2016 | Chu et al. |
| 2017/0366421 A1 | 12/2017 | Dam et al. |

OTHER PUBLICATIONS

Doan, Phouc Huu, "Final Office Action dated Apr. 3, 2018", U.S. Appl. No. 15/494,105, The United States Patent and Trademark Office, dated Apr. 3, 2018.

Doan, Phouc Huu, "Notice of Allowance dated Jun. 6, 2018 ", U.S. Appl. No. 15/494,105, The United States Patent and Trademark Office, dated Jun. 6, 2018.

Doan, Phuoc Huu, "Advisory Action dated Jan. 9, 2017", U.S. Appl. No. 14/850,798, The United States Patent and Trademark Office, dated Jan. 9, 2017.

Doan, Phuoc Huu, "Final Office Action dated Nov. 4, 2016", U.S. Appl. No. 14/850,798, The United States Patent and Trademark Office, dated Nov. 4, 2016.

Doan, Phuoc Huu, "Non-final Office Action dated Jun. 2, 2016", U.S. Appl. No. 14/850,798, The United States Patent and Trademark Office, dated Jun. 2, 2016.

Doan, Phuoc Huu, "Non-Final Office Action dated Nov. 14, 2017", U.S. Appl. No. 15/494,105, The United States Patent and Trademark Office, dated Nov. 14, 2017.

Doan, Phuoc Huu, "Notice of Allowance dated Feb. 14, 2017", U.S. Appl. No. 14/850,798, The United States Patent and Trademark Office, dated Feb. 14, 2017.

Liu, Jung-Jen, "Non-final Office Action dated May 4, 2018", U.S. Appl. No. 15/439,755, The United States Patent and Trademark Office, dated May 4, 2018.

Liu, Jung-Jen, "Notice of Allowance dated Sep. 14, 2018", U.S. Appl. No. 15/439,755, The United States Patent and Trademark Office, dated Sep. 14, 2018.

Mehra, Inder P., "Non-final Office Action dated Jan. 3, 2017", U.S. Appl. No. 14/976,480, The United States Patent and Trademark Office, dated Jan. 3, 2017.

Mehra, Inder P., "Notice of Allowance dated May 5, 2017", U.S. Appl. No. 14/976,480, The United States Patent and Trademark Office, dated May 5, 2017.

Patel, Kamini B., "Non-final Office Action dated Feb. 27, 2019", U.S. Appl. No. 15/619,181, The United States Patent and Trademark Office, dated Feb. 27, 2019.

Wu, Daxin, "Non-final Office Action dated Mar. 5, 2019", U.S. Appl. No. 15/941,674, The United States Patent and Trademark Office, dated Mar. 5, 2019.

\* cited by examiner

US 11,625,506 B1

SECURE ENCLOSURE FOR DEVICES USED TO TEST REMOTE CONNECTIVITY

PRIORITY

This application claims priority to pending U.S. patent application Ser. No. 15/783,859 filed on Oct. 13, 2017. Application Ser. No. 15/783,859 claims priority to U.S. Patent Application Ser. No. 62/409,810 filed on Oct. 18, 2016. Application Ser. No. 15/783,859 and 62/409,810 are hereby incorporated by reference in their entirety.

INCORPORATION BY REFERENCE

The following are incorporated by reference for all that they contain:

"System for Application Test" filed on Sep. 10, 2015, Application Ser. No. 14/850,798.

"System for Network Characteristic Assessment" filed on Dec. 21, 2015, application Ser. No. 14/976,480.

"Adaptive Application Behavior Based on Assessed Network Characteristics" filed on Feb. 23, 2016, Application No. 62/298,820.

"Mobile Device Point of Presence Infrastructure" filed on Mar. 3, 2016, Application No. 62/303,327.

"System for Management of an Array of Proxy Access Devices" filed on Mar. 3, 2016, Application No. 62/303,337.

"System for Assisting in Assessment and Mitigation of Data Network Operations" filed on Jun. 30, 2016, Application No. 62/357,008.

BACKGROUND

Mobile devices executing applications that utilize data networks during operation may experience failures or otherwise produce adverse user experiences as a result of network conditions. Testing of these applications using devices at different physical locations that access different networks may be performed to prevent or mitigate the impacts of failures. Maintaining the devices in a secure manner may prevent loss or tampering of the devices or data stored on the devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
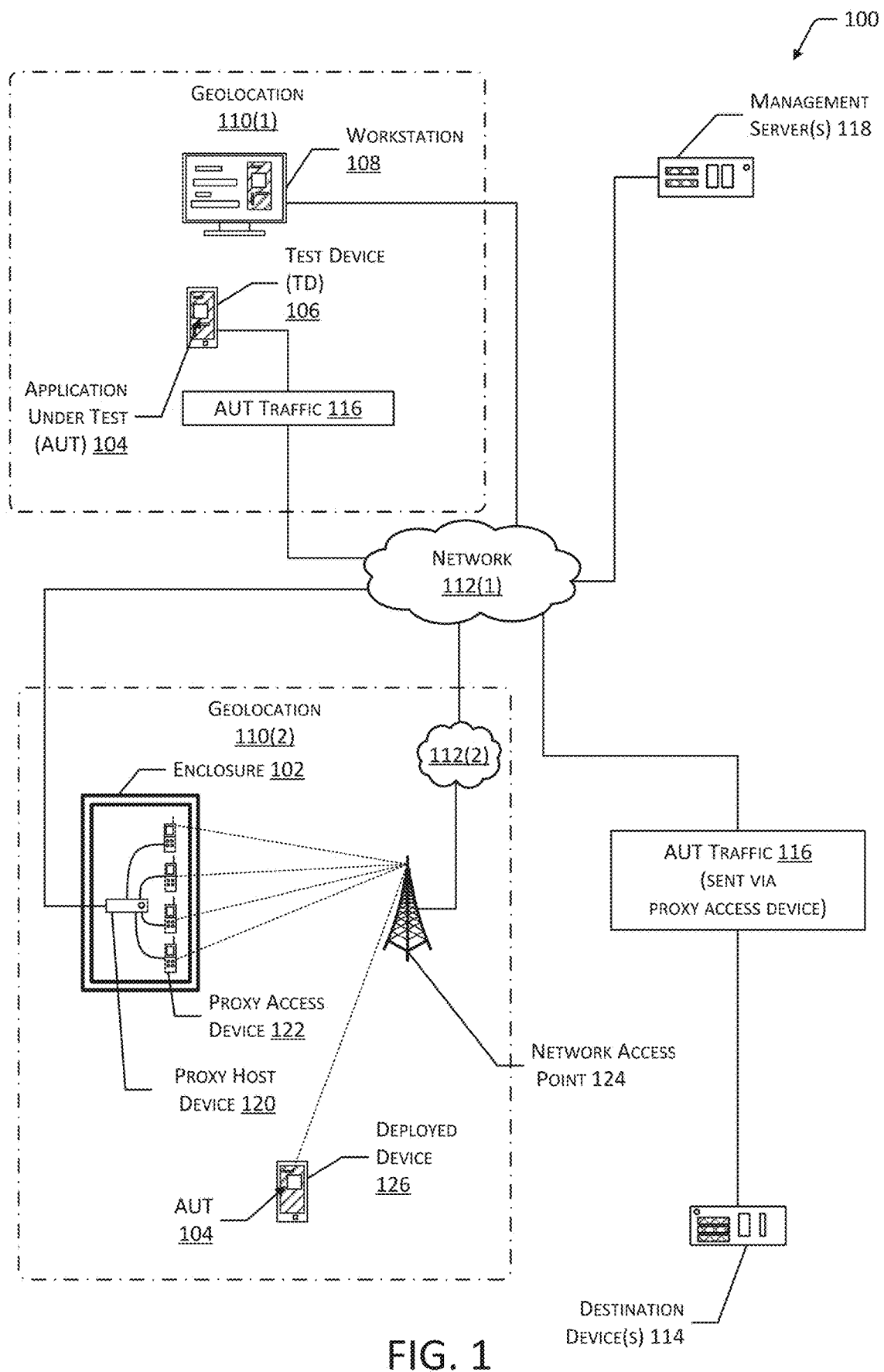
FIG. 1 depicts an implementation of a system for testing applications that utilize network resources, in which devices used to test the applications are placed in a secured enclosure.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Mobile devices may execute an application to provide various functions. Mobile devices may include, but are not limited to, smartphones, laptops, tablet computers, embedded devices, "internet of things" devices, wearable computing devices, appliances, automobiles, aircraft, and so forth. Functions provided by an application may involve retrieval of data, presentation of data to a user, processing of data, and so forth. Some applications may communicate with a destination device, such as a server, using a network, such as a cellular network, a Wi-Fi network, or a wired network such as a wired Local Area Network (LAN). For example, a mapping application may send information to a server that indicates a position of the mobile device and receive map data to present on a display of the mobile device. Problems with this communication may result in the application failing to perform the desired function, error messages, improper operation, and so forth. Continuing the example, a long latency or delay in receiving the map data may cause the application on the mobile device to present an error to the user or result in an adverse user experience. A user may discontinue using the application due to these problems, and instead use another application. Additionally, some problems associated with use of an application while using the network may not be immediately perceived by the user. For example, the application may drain the battery of the mobile device by excessively accessing the destination device, may consume more data than desired, and so forth.

Performance of the network used by the mobile device executing the application may vary due to geographic location (geolocation) of the mobile device, the network access point in use, congestion at the network access point, capability of the network access point, and so forth. For example, during a morning commute, many users may be streaming video entertainment content to their mobile devices, resulting in overall network congestion. As another example, a telecommunication company may have some network access points that support 3G data transmission while other network access points are able to support 4G data transmission.

An application may be tested prior to release to a general population of users by analyzing the performance of an application under test (AUT) under different network conditions. Traditionally, different network conditions have been obtained by simulation or by physically transporting a test device (TD) that is executing the AUT to a particular geolocation. Simulation lacks fidelity to real-world conditions, is expensive to implement and maintain, and may result in developers correcting problems that appear in a simulation but not in the real-world. As a result, simulation of varying network conditions is of limited value. Physically transporting the TD and an operator to perform the tests may provide useful test data, but is expensive and time consuming. Once the application has been deployed to the general population of users, additional information about the conditions of the network and the use by the application of the network may also be useful the developer. For example, data about geolocation and connectivity to the network during usage of the application may allow the developer to adjust the application to provide a better experience to the user.

U.S. patent application Ser. No. 15/783,859, incorporated by reference previously, describes techniques and systems to acquire information regarding use of an application using a collection of proxy host devices that connect to a first network and one or more proxy access devices that provide access to a second network. A proxy access device may execute a local traffic module to facilitate the transfer of data between the first network and the second network. The transfer may be unidirectional or bidirectional. In some implementations, the local traffic module may execute within a non-privileged user space of an operating system of the proxy access device. Proxy access devices may be located at various geolocations, may utilize different telecommunication companies, and so forth. The proxy access devices may be homogenous, such as of the same make and model, or may differ from one another. For example, the proxy access devices may comprise relatively inexpensive commodity cellphones that provide data connectivity for a particular telecommunication company, each associated with a unique subscriber identity module (SIM).

As one example of a testing process, a developer who is present in Sacramento, Calif., USA, may want to test operation of the AUT on a network in Bangalore, Karnataka, India. The developer may utilize one or more user interfaces provided by a Software Development Kit (SDK) to select a proxy access device located in Bangalore. Once selected, in one implementation, the SDK redirects the AUT traffic to the selected proxy access device by way of the first network. In another implementation, router configuration data may be sent to a router through which the AUT traffic will be sent. Responsive to the router configuration data, the router may be configured to subsequently direct the AUT traffic to the selected proxy host device. The proxy access device, in turn, transfers data between the first network and a second network. For example, the proxy access device located in Bangalore may be a cellphone that is tethered to a proxy host device and is also able to connect to a network associated with a telecommunication company in Bangalore. The proxy host device may be used to configure the proxy access device, retrieve status data about the proxy access device, connect the proxy access device to the first network, gather proxy session data, and so forth.

By using such techniques, testing of an AUT may be performed in both pre-launch and post-launch phases of the application quickly, comprehensively, and cost effectively. For example, a developer may select a particular proxy access device to use and run tests of an AUT using a selected network without ever leaving their office. Effects on the AUT resulting from network issues may be discovered more readily and corrected, resulting in an improved user experience, improved mobile device battery life, a reduction in otherwise unnecessary traffic on networks, and so forth.

When placing a proxy access device at a location for testing applications, the proxy access device may be at risk for theft, damage, tampering, and so forth. To prevent such outcomes, proxy access devices, proxy host devices, and other associated devices and components may be placed in a secure enclosure. For example, an enclosure may include a container of any shape or dimension having a mechanism that controls access to the interior. Mechanisms for controlling access may include physical impediments to access, such as locks. In some implementations, a mechanism for controlling access may be used to authorize attempts to access the enclosure. For example, the mechanism may include components for receiving user input, such as a keypad or touch sensor for receiving a pin number, password, gesture, or other method for authenticating an attempt to access the enclosure. In other implementations, the mechanism may receive biometric input, such as a fingerprint, image data using one or more cameras, audio data using one or more microphones, and so forth, which may be used to authorize an attempt to access the enclosure. In still other implementations, the mechanism may receive signals or other types of input from a device, such as an electronic key, a radio frequency identification (RFID) tag, a portable computing device, and so forth. Receipt of input that corresponds to valid authorization data may enable access to the interior of the enclosure. Receipt of input that corresponds to valid authorization data may also enable devices within the enclosure to be accessed or removed, new devices to be added to the enclosure, and so forth. For example, valid authorization data may include a preselected password, lock code, and so forth. Receipt of input that matches a preselected password or lock code may enable access to the interior of the enclosure. Attempts to access the enclosure after providing input that does not match the authorization data or in the absence of input may be determined as an unauthorized access attempt, which may result in notifications, alarms, locking of devices, deletion of data on devices, and so forth.

Devices may be retained in the interior of the enclosure while being used to test an AUT to prevent damage, theft, or tampering of the devices and to prevent access to potentially confidential data stored on the devices or associated with an AUT. The enclosure may also be used to maintain a log, audit, or other type of record that indicates individuals that have accessed the enclosure. For example, if a user provides identifying information to obtain access to the interior of the enclosure, devices that are added to or removed from the enclosure subsequent to receipt of the identifying information may be attributed to the user. The interior of the enclosure may include one or more trays, slots, or other features that may retain a proxy host device, a tablet, a smartphone, or another type of proxy access device in a desired position. In one implementation, an enclosure may contain three proxy host devices and twenty-four proxy access devices. For example, eight proxy access devices may communicate with a single proxy host device. In some implementations, a proxy access device may communicate with a proxy host device using a wired connection, such as a cable engaging a Universal Serial Bus (USB) port of the proxy host device to the proxy access device.

If a wired connection between two devices is disconnected when input that corresponds to valid authorization data to access the interior of the enclosure has not been received, a control action may be performed to protect the security of the proxy access devices. Control actions may include placing one or more devices in a locked state, deactivating one or more devices, or deleting data from one or more devices. For example, a device may execute a security application, such as a "watchdog" application, and in response to detecting an unauthorized disconnection, the application may cause the device to enter a locked state or delete data. When input that corresponds to valid authorization data is received, a signal may be provided to the devices to deactivate the security application or prevent the security application from performing control actions. In other implementations, in response to detecting an unauthorized disconnection a wireless signal may be provided to the device to cause the device to enter a locked state or delete data. Similar control actions may be performed if a disconnection between a device and a power source is detected.

In some implementations, the enclosure may include one or more sensors that determine deformation, displacement, or destruction of a surface of the enclosure. For example, an electrical mesh or similar material may be embedded within a surface of the enclosure, and disturbance of the electrical mesh may cause a signal to be provided to one or more devices in the enclosure. As another example, position sensors, proximity sensors, motions sensors, cameras, and so forth may determine the location or condition of one or more lids, walls, or access panels for an enclosure. In response to sensor data indicative of an unauthorized access attempt, one or more devices may be locked, or data may be deleted from the device(s). In some implementations, the enclosure may include one or more sensors for determining environmental conditions, such as humidity, temperature, wind, and so forth. For example, an environment associated with the enclosure may be monitored, and in some cases, an environment within the interior of the enclosure may be controlled, to reduce wear or damage to devices within the enclosure and increase the lifespan of the devices.

In some implementations, one or more devices in the enclosure may include a touch sensor, and the enclosure may include a device that provides simulated touch input to the touch sensor. For example, a smartphone may be in a locked state, during which the smartphone is not responsive to signals or software commands to cause the device to perform an operation. Input to the touch sensor may be used to unlock the smartphone, after which signals or software commands may be used to control the device. Use of a device within the enclosure that provides simulated touch input may enable smartphones and similar devices to be unlocked, and to allow performance of various operations that utilize touch input to be tested. In one implementation, a device for providing simulated touch input may include a circuit board or similar base member having a planar shape, with one or more conductive members mounted to the base member. The base member may be sized or shaped to be positioned in association with a touch sensor of a device. For example, a base member may include a rectangular printed circuit board (PCB) that is positioned over a rectangular touchscreen display of a smartphone. Continuing the example, when an edge of the base member is within a threshold distance of an edge of the touch sensor, conductive members mounted to the base member may be positioned proximate to desired locations on the touch sensor. For example, conductive members may be positioned at locations that correspond to a capacitive numeric keypad, letters on a capacitive keyboard, locations for providing a gesture input, and so forth. Signals provided to a controller may cause one or more conductive members, to create a change in capacitance to regions of a capacitive touch sensor proximate to the conductive member(s) to simulate touch input provided to the regions of the touch sensor.

In some implementations, the conductive members may be secured to a device using a housing. For example, the base member may include one or more edges extending therefrom, and in some cases, tabs, lips, or other protrusions that extend from the ends of the edges. The base member may contact a front side of a device, such as the side of a smartphone or tablet that includes a touchscreen display, while the edges extending from the base member may contact the edges of the device. Lips or protrusions extending from the edges may contact or limit movement of a back side of the device. Positioning the base member into association with the device in this manner may position the conductive members over selected locations of the touch sensor of the device. In other implementations, a base member may be secured to a device using mechanical means, such as clips or other fasteners, adhesives, and so forth.

In some implementations, a control device in the enclosure may be used to test one or more of the devices using other communication protocols. For example, a proxy access device may communicate with a test device using a first communication protocol, such as Wi-Fi, but may also be capable of communication using another protocol, such as Bluetooth. The control device may establish a Bluetooth communication link with the proxy access device to enable the exchange of Bluetooth data by the proxy access device. In some implementations, the control device may be used to control the sample rate for the Bluetooth data, a transmit power used by a Bluetooth transceiver of the control device, a mode of the Bluetooth connection between the control device and the proxy access device, other characteristics of the Bluetooth data or transmission, and so forth. For example, the control device may simulate a headset that communicates with a smartphone using a Bluetooth protocol, and a proxy access device may exchange data with the control device using a sample rate and other settings that simulate data that would be exchanged with a headset. Continuing the example, Bluetooth data that includes audio may be provided from the proxy access device to the control device to generate test data indicative of the Bluetooth transmission performed by the proxy access device without causing the output of audio. As another example, the control device may simulate a microphone or other type of Bluetooth source or input device, which may provide Bluetooth data to the proxy access device. Test data indicative of the receipt of Bluetooth data performed by the proxy access device may then be generated. In other cases, data may be exchanged between the control device and the proxy access device bidirectionally (e.g., full duplex communication). The control device may function as a universal adapter for transmitting data to and from proxy host devices and proxy access devices. For example, the control device may be used to send and receive data in any format for testing, including formats not natively supported by the proxy host device or proxy access device. In some implementations, the control device may be used to provide commands to the proxy access device or proxy host device that simulate commands provided using a Bluetooth controller, such as commands associated with remote control devices, headsets, and so forth. For example, a simulated command associated with a remote control device may include a command to play content, pause content, list contacts associated with a device, and so forth. In some implementations, a command from the control device may be used to reset or power cycle particular communication links or devices in the enclosure, while maintaining other communication links. For example, the control device may maintain a communication link with a proxy host device and a communication link with a first proxy access device, while resetting a communication link used by a second proxy access device. The control device may also be used to limit the pairing of proxy access devices for security purposes. For example, a single Bluetooth module on the control device may be paired with a single proxy access device, and the communication link between the module and the proxy access device may remain until terminated by a command from the proxy host device, such that another device is prevented from controlling the link or determining content of the communication between the devices.

FIG. 1 depicts an implementation of a system 100 for testing applications that utilize network resources, in which devices used to test the applications are placed in a secured enclosure 102. An application under test (AUT) 104 may be executed on a computing device, such as a test device (TD) 106, a workstation 108, and so forth. For example, the TD 106 may comprise a mobile device such as a smart phone, tablet computer, wearable computing device, and so forth. The workstation 108 may comprise a laptop, desktop computer, and so forth. The AUT 104 may be an application that is at any stage in a development or maintenance lifecycle. For example, the AUT 104 may comprise a software that has not yet been released (e.g., an alpha, prerelease, or prelaunch version), or may comprise a previously released version that is undergoing testing. The workstation 108 may include an integrated development environment (IDE) to facilitate the creation and editing of program code, debugging, compiling, and so forth. In some implementations, the workstation 108 may comprise an emulator or simulator that is designed to execute the AUT 104 as if it were executing on another piece of hardware, under a different operating system, and so forth.

As shown in FIG. 1, the TD 106 or workstation 108 on which the AUT 104 is executed may be located at a first geolocation 110(1). The geolocation 110 comprises a geographic location, such as a particular room, building, city, state, country, and so forth. For example, the geolocation 110 may be specified by a set of coordinates with regard to latitude and longitude on the surface of the Earth.

One or more of the TD 106 or the workstation 108 may be connected to a first network 112(1). The first network 112(1) may, in turn, be connected to or be part of a larger network. For example, the first network 112(1) may comprise the Internet. The connection used by the TD 106 or the workstation 108 may include, but is not limited to, a wired Ethernet connection, a wireless local area network (WLAN) connection such as Wi-Fi, and so forth. For example, the first geolocation 110(1) may comprise an office, and the TD 106 may connect to a local Wi-Fi access point that is connected via Ethernet cable to a router. The router, in turn, may be connected to a cable modem that provides connectivity to the Internet. During operation, the AUT 104 may access an external resource, such as one or more destination devices 114.

The AUT 104 may generate AUT traffic 116 that is exchanged with the destination device(s) 114 during operation. Traditionally, the AUT traffic 116 generated by the TD 106 at the first geolocation 110(1) would be sent to the first network 112(1) and on to the destination device 114. However, this traditional situation limits the ability to generate test data to data that reflects conditions associated with the first geolocation 110(1) and first network 112(1).

To enable the AUT to be tested under conditions associated with different geolocations 110 and networks 112, a software development kit (SDK) may be incorporated into the AUT 104. In other implementations, techniques other than an SDK may be used to provide the functionality described herein. For example, lines of computer code that provide the functionality of at least a portion of the SDK may be incorporated into the code base of the AUT 104. The SDK may provide a user interface that allows for the redirection of the AUT traffic 116. For example, the SDK may comprise instructions to establish communication with one or more management servers 118 that may include modules for coordinating the activities of devices and analyzing data determined from the devices.

The management server 118 may coordinate the activities of one or more of proxy host devices 120 or proxy access devices 122. The proxy host device 120 may connect to the first network 112(1) and to one or more of the proxy access devices 122. For example, the proxy host device 120 may comprise a server, desktop computer, tablet or other type of computing device to which eight proxy access devices 122 are connected using a wired connection, such as a cable connecting each proxy access device 122 to a USB port of the proxy host device 120. While FIG. 1 depicts a single proxy host device 120 and four proxy access devices 122, any number of proxy host devices 120 and proxy access devices 122 may be maintained within the enclosure 102. In one implementation, the enclosure 102 may include one or more trays, each tray having slots for retaining at least one proxy host device 120 and multiple proxy access devices 122. For example, an enclosure 102 may include from one to three trays and may contains three proxy host devices 120 and twenty four proxy access devices 122, with eight proxy access devices 122 communicating with each proxy host device 120.

The proxy access devices 122 may connect to a network access point 124 that provides connectivity to a second network 112(2). For example, the proxy access devices 122 may comprise commodity cellphones, the network access points 124 may comprise cell phone towers, and the second network 112(2) may comprise a WWAN, such as a wireless cellular data network (WCDN). The second network 112(2) may in turn communicate with the first network 112(1). For example, a WCDN operated by a telecommunication company may interconnect or have a peering agreement with an Internet backbone provider. As a result, a user of the second network 112(2) may be able to access resources on the first network 112(1), and vice versa. In some implementations, the proxy access devices 122 may be capable of communication with the destination device(s) 114 or other devices using the second network 112(2) or another network 112, such as a cellular network, without communicating using the first network 112(1).

As shown in FIG. 1, the proxy access devices 122 may be located at a geolocation 110(2) that is different from that of the TD 106. For example, the enclosure 102 and the devices maintained in the enclosure 102 may be located in another city, state, country, and so forth that differs from the location of the TD 106. As part of the testing process for the AUT 104, a user interface may be presented to enable a user at the first geolocation 110(1) to select one or more of a particular geolocation 110 or particular proxy access device 122 to use during testing. The management server(s) 118 may maintain information about the proxy access devices 122, such as geolocation 110, availability, cost, type of proxy access device 122, and so forth. The management server(s) 118 may coordinate establishment of a connection between the AUT 104 and the proxy access device 122 that was selected.

During testing, the AUT traffic 116 may be routed through the first network 112(1) to the proxy host device 120, through the proxy access device 122 to the second network 112(2), and then on to the first network 112(1) to ultimately arrive at the destination device 114. The AUT traffic 116 may include outbound application traffic sent from the AUT 104 to the destination device 114 and inbound application traffic sent from the destination device 114 to the AUT 104. During operation, the AUT 104 may direct outbound application traffic to the proxy host device 120, which transfers the outbound application traffic to the proxy access device 122, which then sends the outbound application traffic to the second network 112(2). The second network 112(2) may send the outbound application traffic to the destination device 114. Inbound application traffic from the destination device 114 may follow the reverse path. The management server(s) 118 may collect log data associated with operation of the system, such as information associated with operation of the proxy access device 122, packet capture of data transferred by the proxy host device 120, and so forth. Log data may also indicate, for a particular instant in time, one or more of: a current page on a website, type of network that the proxy access device 122 is connected to, quantity of data received, quantity of data transmitted, latency to the destination device 114, data throughput, received signal strength, transmit power, cost associated with data transfer on the second network 112(2), and so forth. The data may therefore represent the AUT 104 operating on a real-world second network 112(2) at a desired geolocation 110(2).

Instead of, or in addition to data determined by the management server(s) 118, one or more deployed devices 126 may provide deployed log data to the management server 118. Deployed devices 126 may include, but are not limited to, smartphones, laptops, tablet computers, embedded devices, wearable computing devices, appliances, automobiles, aircraft, and so forth. A deployed device 126 may execute the AUT 104 that incorporates the SDK.

Data determined by operation of the proxy access devices 122 may be used to generate reports, determine modifications to the AUT 104, and so forth. While the AUT 104 is executing on the proxy access devices 122, one or more of the proxy access devices 122 or the proxy host devices 120 may display or store proprietary information. For example, it may be desirable to prevent individuals located at the second geolocation 110(2) from viewing displays associated with the proxy access devices 122, accessing data stored on the proxy access devices 122 or proxy host devices 120, or tampering with the devices themselves. As such, the proxy host devices 120 and proxy access devices 122 may be maintained in a secure enclosure 102 that is configured to limit access to the devices, and in the event of an unauthorized access, cause one or more devices to be locked, deactivated, or delete data from the devices.

Figure 2:
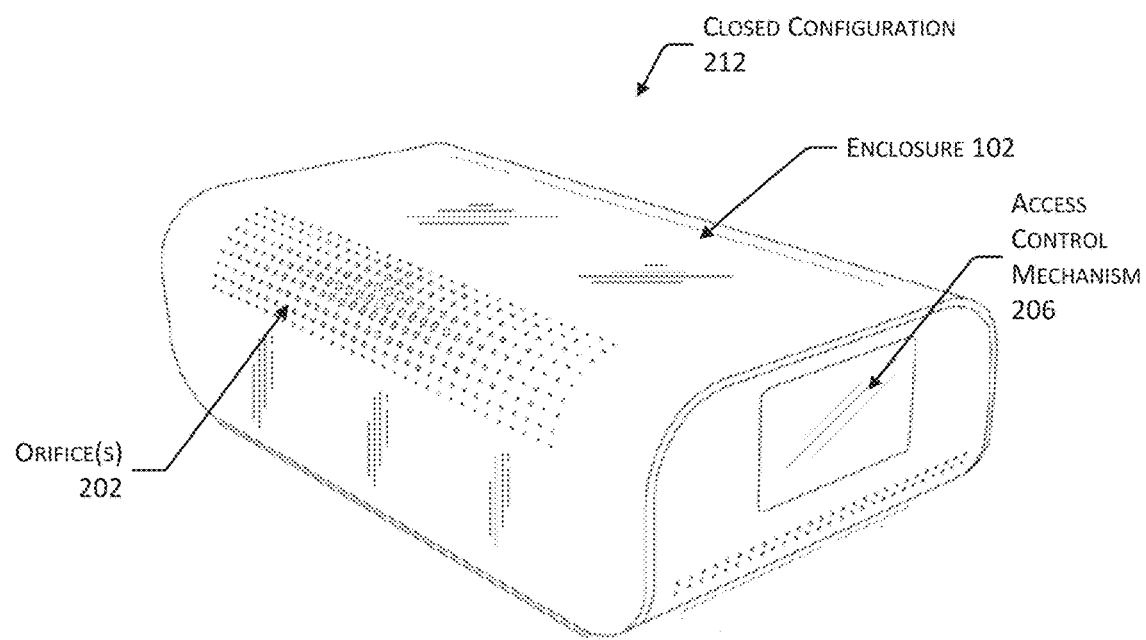
FIG. 2 depicts an implementation of an enclosure for maintaining devices used to test applications.
Figure 2:
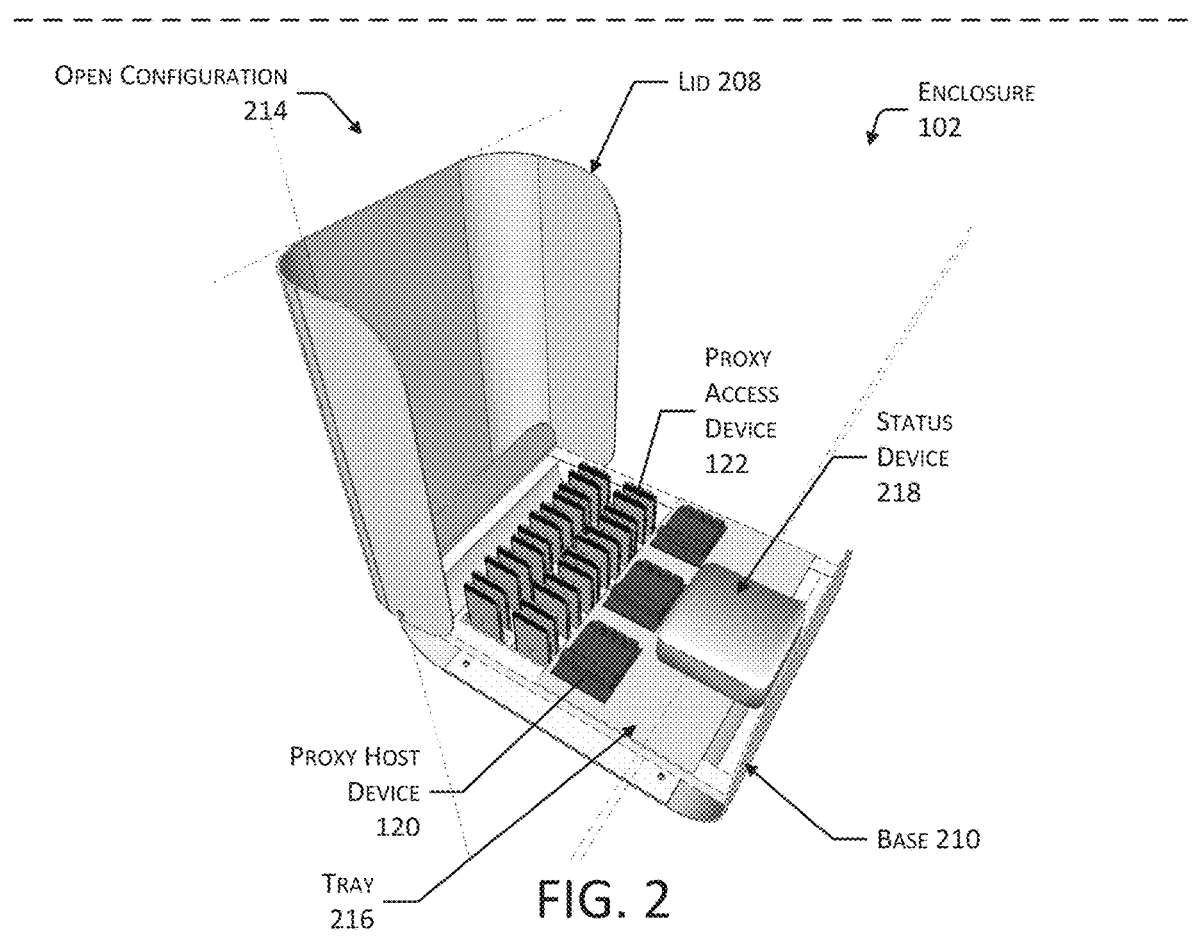

FIG. 2 depicts an implementation of an enclosure 102 for maintaining devices used to test applications. While FIG. 2 depicts a single enclosure 102, in some implementations, multiple enclosures may be stacked, placed side-by-side, mechanically engaged to one another, and so forth. The enclosure 102 is shown having a generally rectangular shape defined by multiple contiguous or adjoining surfaces, such as a top, a bottom, and multiple edges that define walls of the enclosure 102. The enclosure 102 may include ventilation holes or other types of orifices 202 to allow for the exchange of ambient air to provide cooling for devices inside the enclosures 102. While the orifices 202 are shown as small holes having a generally round shape, in other implementations, any number of orifices 202 having any shape may be used. In some implementations, the enclosure 102 may contain proxy host devices 120 and proxy access devices 122, as well as additional devices, such as power conditioning circuitry, networking devices, power management devices, and so forth. For example, power management devices may include a remote power management device that allows for power to the proxy host devices 120, proxy access devices 124, or other devices in the enclosure 102 to be cycled.

The enclosure 102 is shown having an access control mechanism 206. The access control mechanism 206 may be used to control physical access to the interior of the enclosure 102. For example, FIG. 2 depicts the access control mechanism 206 as a touchscreen display, which may include a touch sensor for receiving input indicative of a pin number, password, gesture, and so forth. In cases where the access control mechanism 206 includes or is associated with a display, the access control mechanism 206 may also be used to present information regarding the status of the enclosure 102 or one or more of the devices in the enclosure 102. In some cases, input to the access control mechanism 206 may be used to navigate one or more interfaces that present information regarding the enclosure 102 or one or more of the devices. In other implementations, the access control mechanism 206 may be configured to receive user input, such as a fingerprint, image data from one or more cameras, audio data from one or more microphones, or other types of input to authorize an attempt to access the interior of the enclosure 102. In response to input that corresponds to authorization data indicative of a preselected password, number, gesture, or other type of input, the access control mechanism 206 may cause actuation of a lock or other type of mechanism used to prevent access to the interior of the enclosure 102. For example, the enclosure 102 may include a lid 208, access panel, or other type of closure mechanism that may be opened to access the interior. For example, FIG. 2 depicts the enclosure 102 including a lid 208 that is moveable relative to a base 210 to open the enclosure 102. The closure mechanism may be secured using one or more locks or other types of mechanical, electrical, or magnetic mechanisms, which may be actuated to allow opening of the enclosure 102(1) in response to particular input to the access control mechanism 206.

For example, FIG. 2 depicts the enclosure 102 shown in a closed configuration 212 and an open configuration 214. In response to input to the access control mechanism 206 that matches a preselected password, number, gesture, or other type of input, a lock may be actuated to allow the lid 208 of the enclosure 102 to be moved relative to the base 210 of the enclosure 102, enabling access to the interior. The interior of the enclosure 102 may contain proxy host devices 120, proxy access devices 122, other types of devices, and so forth. In some implementations, the proxy host devices 120 and proxy access devices 122 may be retained in a tray 216 within the enclosure 102. The tray 216 may include slots or other types of recessed regions for containing the proxy host devices 120 and slots for containing the proxy access devices 122. For example, the slots of the tray 216 are shown including three recessed regions for containing proxy host devices 120, and three groupings of eight slots, with each grouping of eight slots for containing proxy access devices 122. Each grouping of slots for retaining proxy access devices 122 is shown positioned in alignment with a respective slot for containing a proxy host device 120. Each of up to eight proxy access devices 122 placed in one of the slots may be engaged with the corresponding proxy host device 120 positioned in the aligned slot. For example, one or more of the slots that retain a proxy access device 122 and one or more of the slots that retain proxy host devices 120 may include a hole through which a connector, such as a USB cable, may be routed to engage proxy access devices 122 to a proxy host device 120.

In some implementations, the tray 216 may include one or more status devices 218. The status device(s) 218 may include a controller, system-on-a-chip, or other computing device with a display device to provide output to an operator. For example, a status device 218 may be configured to present information indicative of the status a proxy host device 120, the status of individual proxy access devices 122, and so forth. While FIG. 2 depicts a single status device 218, other implementations may include multiple status devices 218 such as one status device 218 associated with each proxy host device 120. In some implementations the status device 218 may itself initiate performance of diagnostic operations or other operations associated with the devices within the tray 216. In some implementations, the status device 218 may function as an access control mechanism 206. For example, the status device 218 may be configured to receive user input to authorize an attempt to add or remove a proxy host device 120 or proxy access device 122 from the tray 216. Continuing the example, if user input that corresponds to authorization data indicative of a valid password, lock code, or other type of authorization is received at the status device 218, a proxy host device 120 may provide a signal to one or more of the proxy access devices 122 to deactivate a security application. If user input that corresponds to the authorization data, indicating a valid access attempt, is not received, disconnection of a proxy access device 122 from a proxy host device 120 or other device within the enclosure 102 may cause the security application to lock, deactivate, or delete data associated with the proxy access device 122. Similar authorization methods may also be used to control removal of proxy host devices 120 from the enclosure 102 or disengagement of proxy host devices 120 from other devices. In some cases, the authorization data may include types of inputs that expire. For example, a password may be generated at a first time, and at a time that input is received, a second time may be determined. If the interval between the first time and the second time is less than a threshold length of time, the input may correspond to a valid access attempt. However, if the interval is greater than a threshold length of time, the attempt to access the enclosure 102 may not be authorized. In other cases, authorization data may be modified manually or automatically. For example, after a particular password or lock code is used a selected number of times, that password or lock code may be removed from the authorization data.

Similarly, in some implementations, the access control mechanism 206 may be in communication with one or more of the devices within the enclosure 102. For example, in response to valid input to the access control mechanism 206, a security application, such as a "watchdog" application, may be deactivated or suspended on one or more devices to enable removal or modification of the devices by a user accessing the enclosure 102. However, if the access control mechanism 206 determines opening of a lid 208 or other closure mechanism, deformation of a surface of the enclosure 102, impact or movement of the enclosure 102 beyond a threshold value, and so forth, a signal may be provided to one or more devices in the enclosure 102 to cause the devices to be locked, deactivated, or to cause data on the devices to be deleted. In other implementations, an enclosure 102 may have shapes other than those shown in FIG. 2 and may use closure mechanisms other than a lid 208 to control access to the interior.

Figure 3:
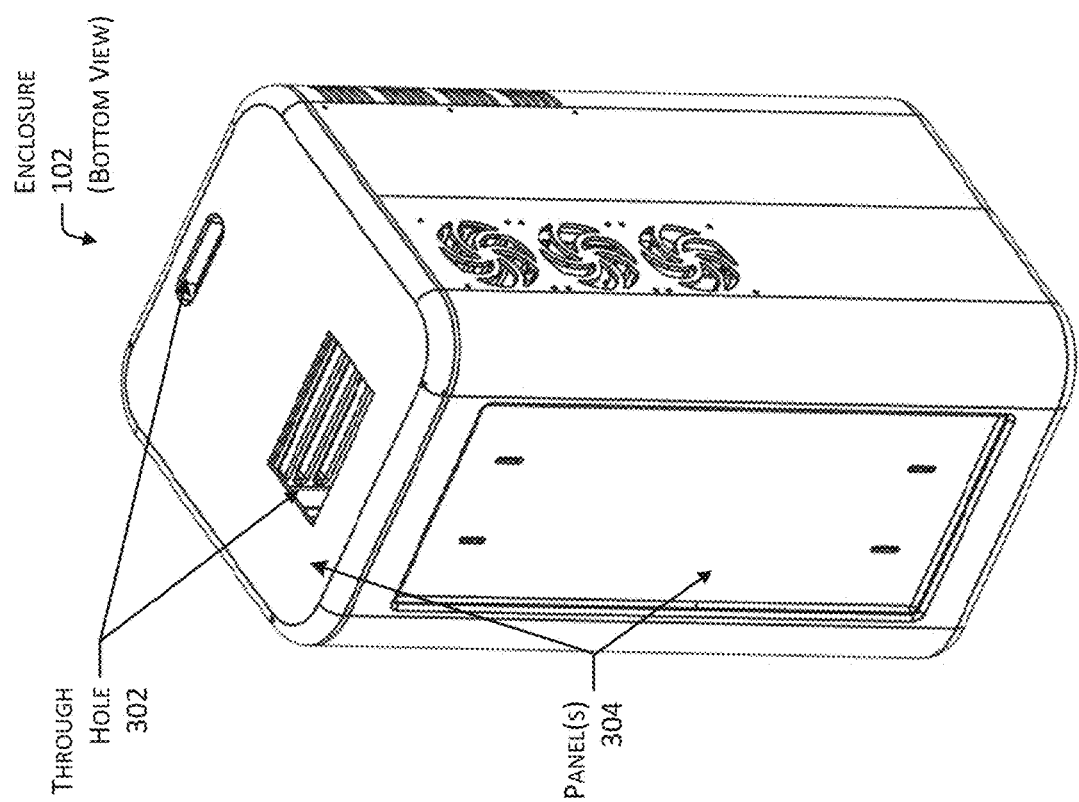
FIG. 3 depicts an implementation of an enclosure for maintaining devices used to test applications.
Figure 3:
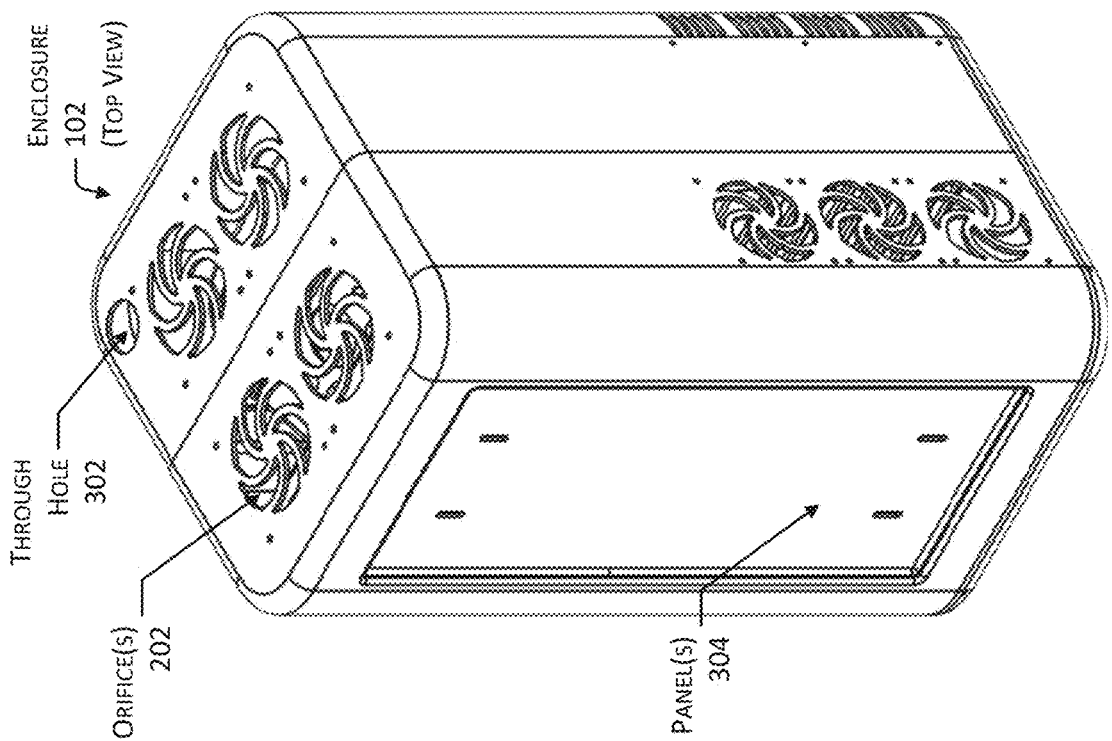

For example, FIG. 3 depicts an implementation of an enclosure 102 for maintaining devices used to test applications. Specifically, FIG. 3 shows a top view and a bottom view of the enclosure 102. The enclosure 102 is shown having a generally elongated rectangular shape, with orifices 202 to allow for the exchange of ambient air to provide cooling for devices inside the enclosure 102. As described with regard to FIG. 2, orifices 202 may have any shape and any number of orifices 202 may be used. The enclosure 102 is also shown having one or more through holes 302 for accommodating the passage of cables, such as power conductors, network cables, and so forth. In some implementations, through holes 302 may be used to enable visualization of devices or other components within the enclosure 102, placement of access control mechanisms 206, and so forth. One or more access panels 304 may be used to access the interior of the enclosure 102. As described with regard to FIG. 2, one or more access control mechanisms 206 may be used to control access to the interior of the enclosure 102, such as by receiving and validating input prior to enabling opening of the panel 304 or another closure mechanism. For example, an access control mechanism 206 may be associated with one or more locks or other mechanical elements that prevent opening of the panel 304.

While FIGS. 2 and 3 depict example enclosures 102 that may be used to retain devices, other types of enclosures 102 having other shapes and dimensions may be used. In some implementations, the enclosure 102 of FIG. 2, the enclosure 102 of FIG. 3, or other types of enclosures 102 may be made from one or more plastic materials, such as fire-retardant plastic, that may provide less interference to the transmission and receipt of signals when compared to an enclosure 102 formed from metal.

Figure 4A:
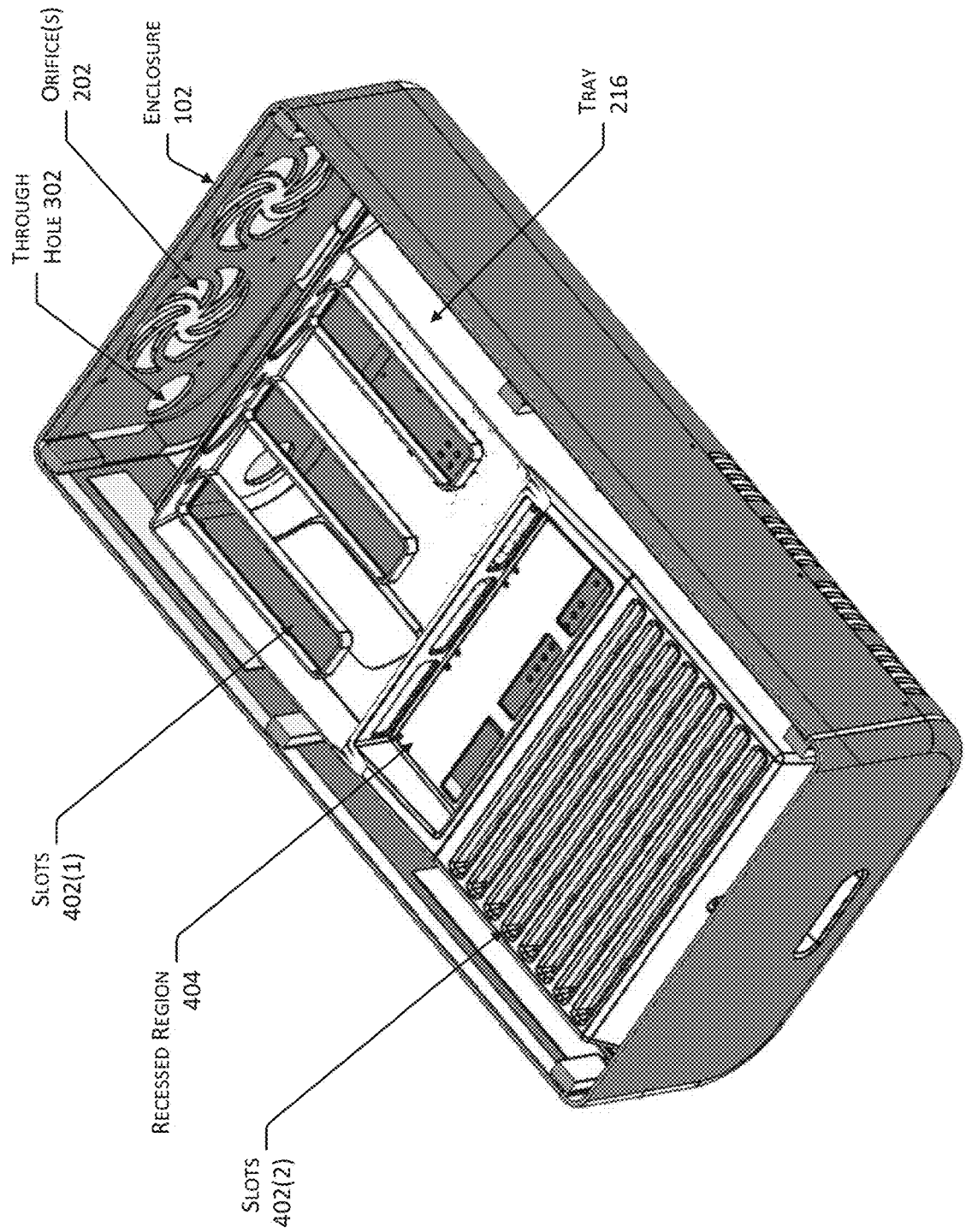
FIG. 4A depicts a first cut-away view of the enclosure of FIG. 3 showing a tray for maintaining devices used to test applications.

FIG. 4A depicts a cut-away view of the enclosure 102 of FIG. 3 showing a tray 216 that may be used to support devices used to test applications. For example, one or more trays 216 may be placed within an enclosure 102 or may be integral with or formed in the interior of the enclosure 102. The tray 216 may be configured to retain proxy host devices 120, proxy access devices 122, or other devices associated with the system 100. In other implementations, other devices may be supported. For example, one or more proxy host devices 120 may be located underneath the tray 216 or elsewhere, while USB hubs are held by the tray 216. The tray 216 may comprise one or more of plastic, ceramic, metal, cardboard, and so forth. For example, the tray 216 may comprise ABS plastic.

A first set of slots 402(1) within the tray 216 may retain proxy host devices 120. For example, FIG. 4A depicts the tray 216 including three rectangular slots 402(1). A proxy host device 120 may be placed in one or more of the slots 402(1). A second set of slots 402(2) within the tray 216 may retain proxy access devices 122. For example, FIG. 4A depicts the tray 216 including eight rectangular slots 402(2) extending across the width of the tray 216 in a direction generally perpendicular to the first set of slots 402(1). The width of the slots 402(2) may enable each slot 402(2) to accommodate devices having a variety of widths. For example, a slot 402(2) may have a width sufficient to accommodate a single tablet, three smartphones, and so forth. In other implementations, other numbers and configurations of slots 402 may be used. For example, the tray 216 of FIG. 2 is shown having three groupings of eight slots 402(2), with each grouping of eight slots 402(2) being positioned in alignment with a respective slot 402(1) for containing a proxy host device 120. Proxy access devices 122 placed in one of the slots 402(2) may be engaged with a corresponding proxy host device 120 positioned one of the slots 402(1). For example, one or more of the slots 402(2) that retain a proxy access device 122 and one or more of the slots 402(1) that retain proxy host devices 120 may include a hole through which a connector, such as a USB cable, may be routed to engage proxy access devices 122 to a proxy host device 120.

In some implementations, the tray 216 or enclosure 102 may include one or more recessed regions 404, through holes 302, or other features, which in some implementations may be used to retain status devices 218. Status device(s) 218 may include a controller, system-on-a-chip, or other computing device with a display device to provide output to an operator. For example, a status device 218 may be configured to present information indicative of the status of a proxy host device 120, the status of individual proxy access devices 122, and so forth. FIG. 4A depicts the recessed region 404 including a rectangular region extending across the width of the tray 216, with through holes 302 that may accommodate the passage of cables or other connectors. In the implementation shown in FIG. 4A, the recessed region 404 may accommodate three status devices 218, each of which may be associated with a single proxy host device 120 and a group of associated proxy access devices 122. In other implementations, a single status device 218 may be associated with each device within the tray 216, or other numbers of status devices 218 may be used. In other implementations, trays 216 having other shapes, numbers and arrangements of slots 402, and numbers and arrangements of status devices 218 or other devices may be used. For example, FIGS. 5-8 depict other possible implementations of trays 216.

Figure 4B:
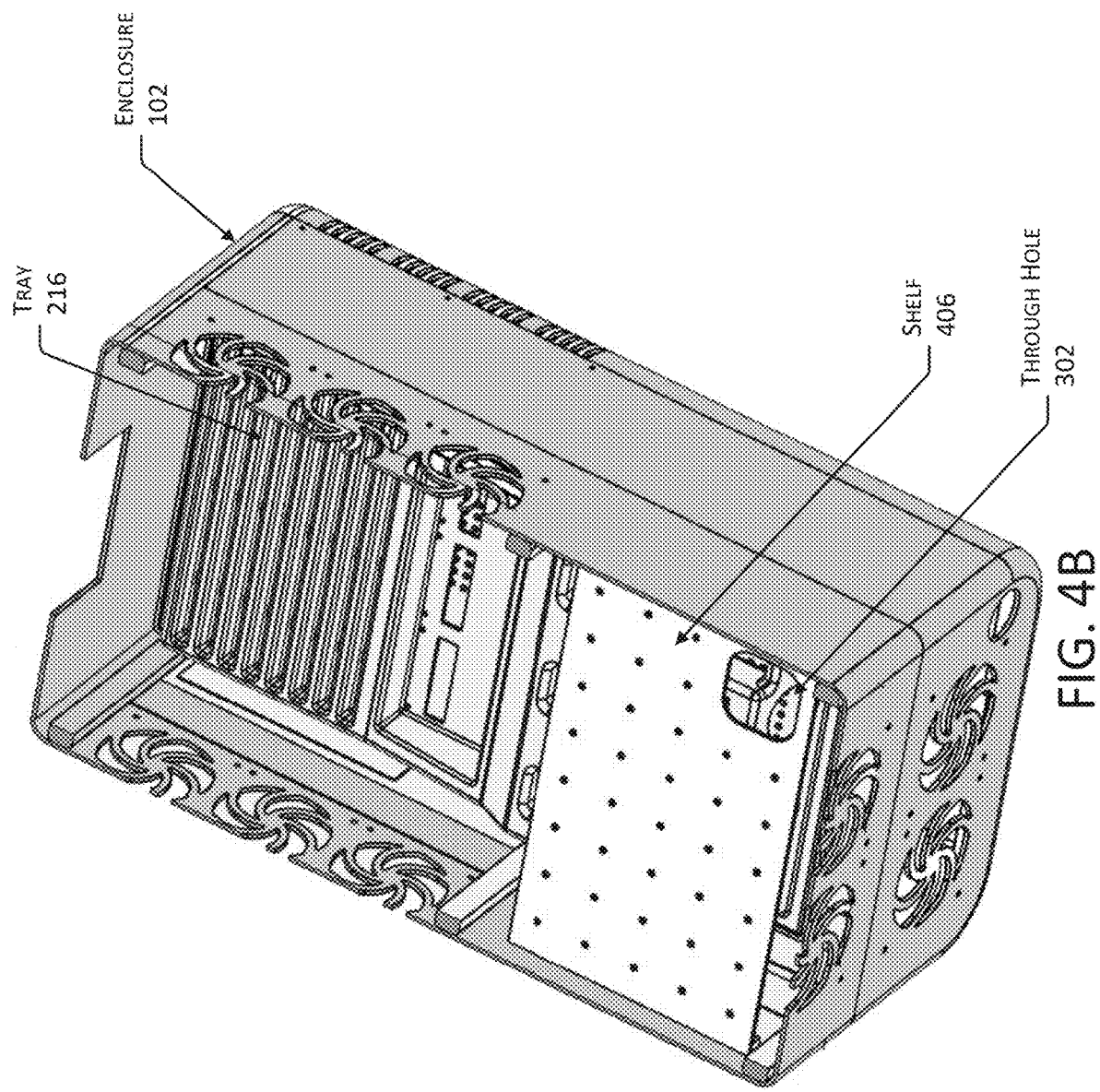
FIG. 4B depicts a second cut-away view of the enclosure of FIGS. 3 and 4A showing a shelf positioned above the tray.

FIG. 4B depicts a second cut-away view of the enclosure 102 of FIGS. 3 and 4A showing a shelf 406 positioned above the tray 216. In some implementations, proxy host devices 120, proxy access devices 122, and status devices 218 may be supported by the tray 216, while other devices, such as power sources, power conditioning circuitry, USB hubs, and so forth may be placed on the shelf 406. The shelf 406 may include one or more through holes 302 that may accommodate passage of cables or other connectors that may engage devices on the shelf 406 with other devices in the enclosure 102, such as devices supported by the tray 216.

Figure 5:
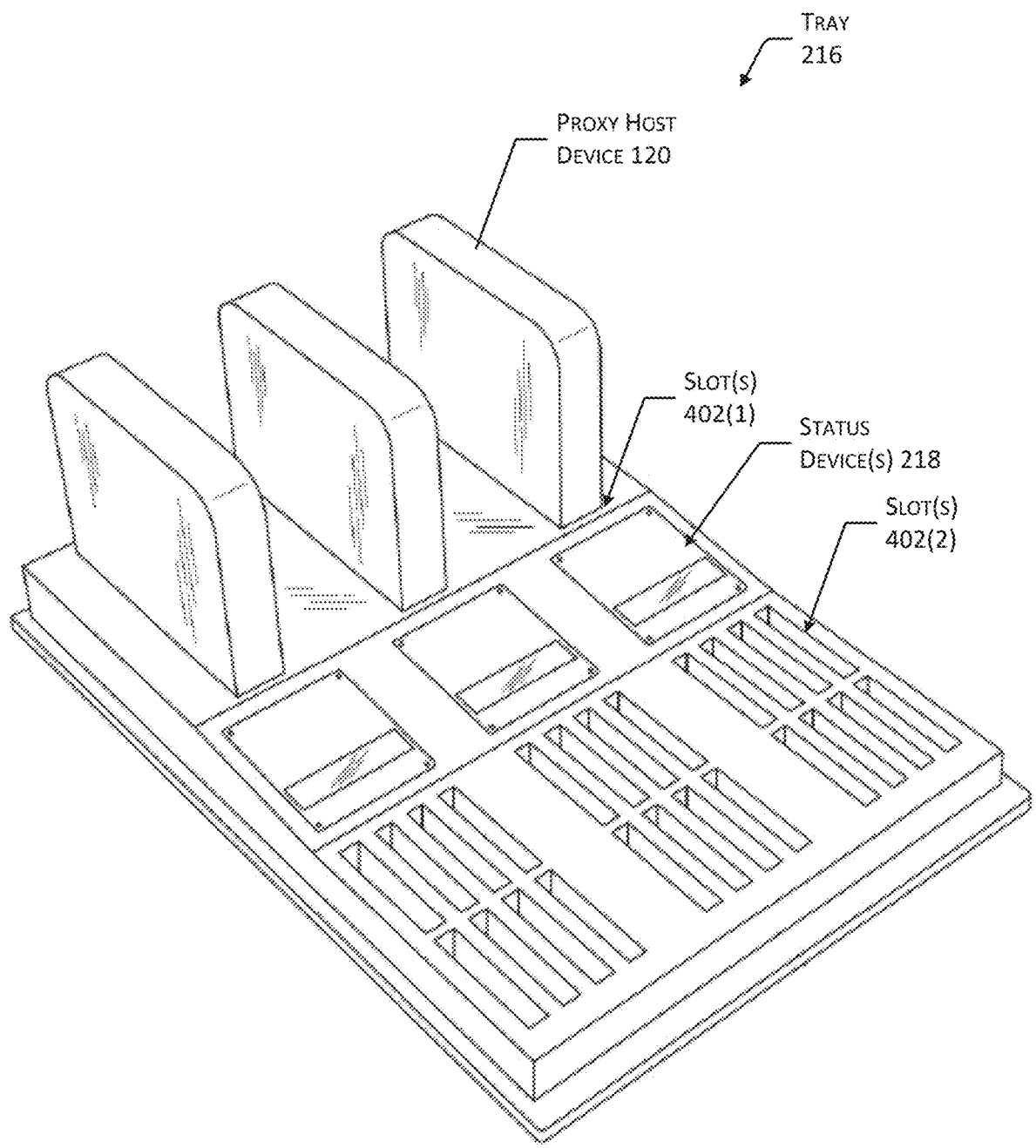
FIG. 5 depicts an implementation of a tray that may support devices within an enclosure.

FIG. 5 depicts an implementation of a tray 216 having a first set of slots 402(1) that enable vertical orientation of proxy host devices 120, which may enable the tray 216 to have a reduced length or width when compared to trays 216 that accommodate horizontal placement of proxy host devices 120. The tray 216 of FIG. 5 is also shown having three grouping of eight slots 402(2) for retaining proxy access devices 122. In some implementations, each grouping of slots 402(2) may have access holes to enable engagement of the devices within the slots 402(2) to a corresponding proxy host device 120 in the slot 402(1) aligned with the grouping of slots 402(2). The tray 216 is also shown retaining three status devices 218. In some implementations, each status device 218 may indicate the status of or control one or more functions of a single proxy host device 120 or group of proxy access devices 122. In other implementations, the regions of the tray 216 that contain the status devices 218 may contain USB hubs for engagement with the proxy host device 120, proxy access devices 122, or other devices within the enclosure 102.

Figure 6:
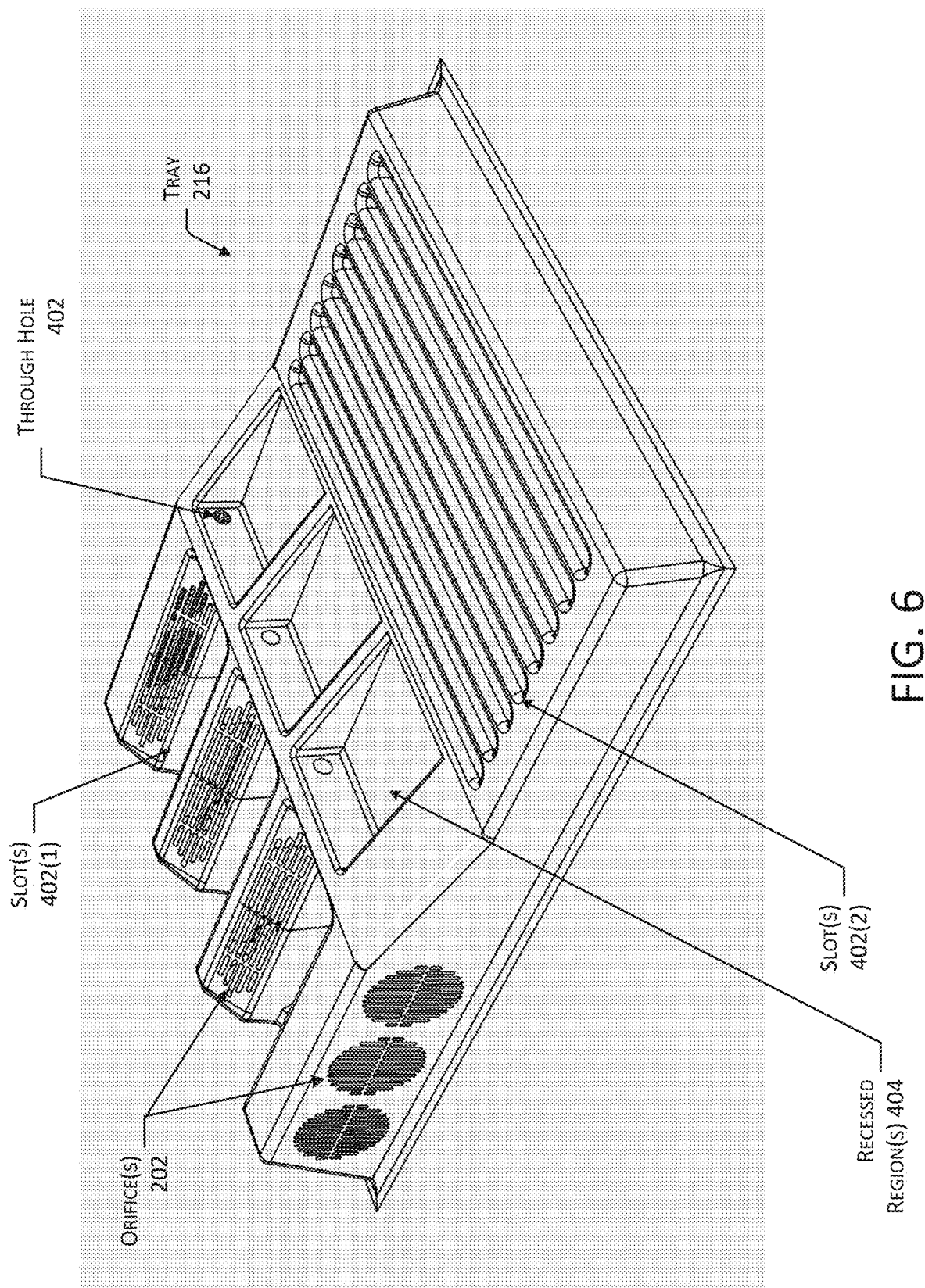
FIG. 6 depicts a front view of an implementation of a tray that may support proxy host devices, proxy access devices, status devices, or other devices.

FIG. 6 depicts a front view of an implementation of a tray 216 that may support proxy host devices 120, proxy access devices 122, status devices 218, or other devices. In some implementations, the tray 216 may include a single piece of material. In other implementations, the tray 216 may include multiple pieces of material that have been joined using mechanical fasteners, welding, adhesives, mechanical fit, and so forth.

The tray 216 may include one or more sets of orifices 202, which may function as vents to facilitate cooling of devices that are located under or within the tray 216. While the orifices 202 are shown as generally rectangular slits, in other implementations, orifices 202 having other shapes may be used. The tray 216 is also shown including a first set of slots 402(1) that may retain proxy host devices 120 or other types of devices. The orientation of the slots 402(1) may enable proxy host devices 120 to be maintained in a vertical orientation. A second set of slots 402(2) may be used to retain proxy access devices 122 or other types of devices. In the implementation shown in FIG. 6, the slots 402(2) extend substantially across the width of the tray 216. The length of the slots 402(2) may allow the slots 402(2) to accommodate proxy access devices 122 of different widths, such as smart phones, tablets, and so forth. In some cases, a single slot 402(2) may accommodate multiple devices adjacent to one another. For example, a single slot 402(2) having a length sufficient to accommodate a tablet may be used to accommodate multiple smartphones positioned side-by-side.

FIG. 6 also depicts the tray 216 including multiple recessed regions 404, in which status devices 218, USB hubs, or other types of devices may be placed. The recessed regions 404 may each include a through hole 302, which may accommodate passage of a connector, such as a cable engaging a status device 218 to a proxy host device 120.

Figure 7:
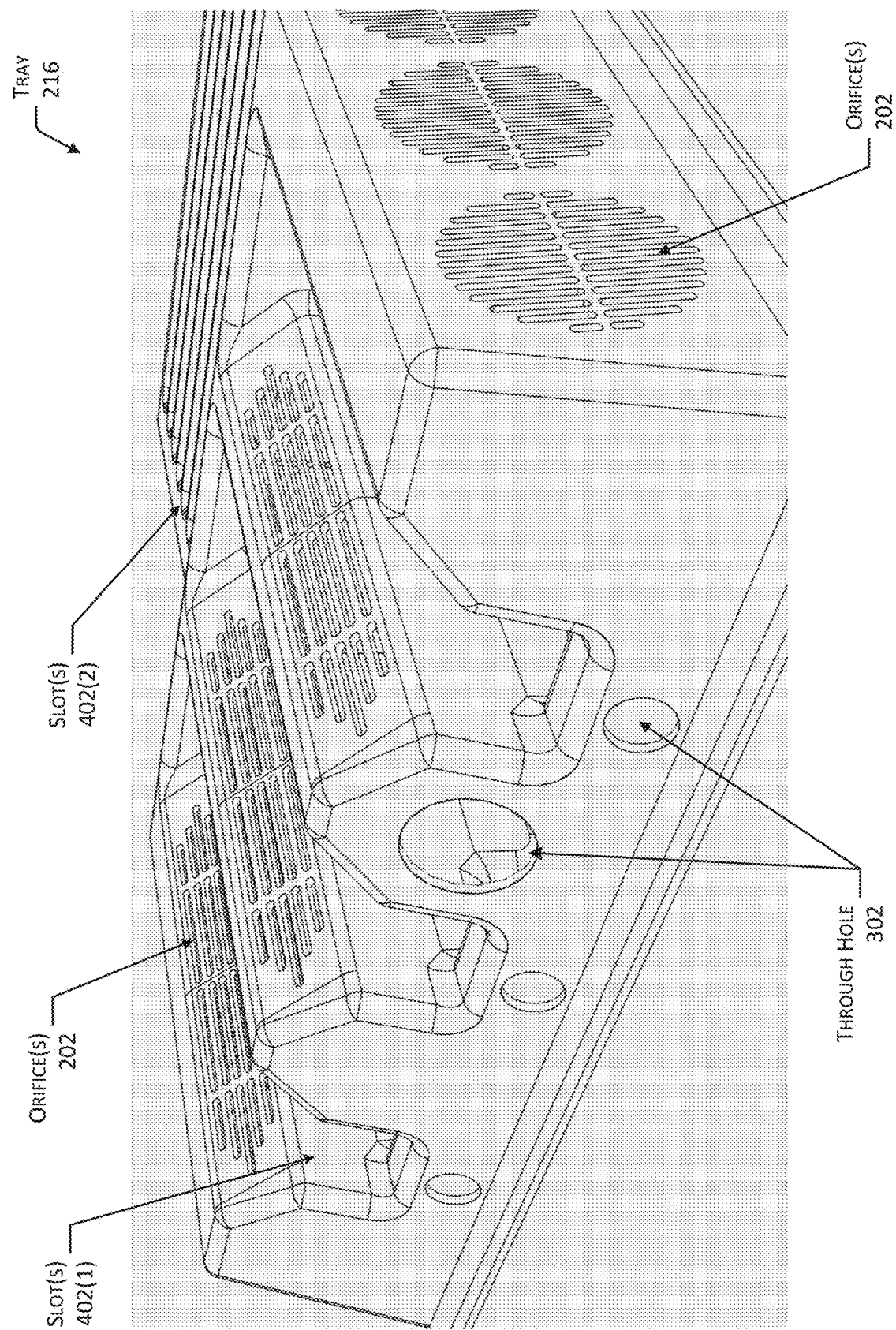
FIG. 7 depicts a back view of the tray of FIG. 6.

FIG. 7 depicts a back view of the tray 216 of FIG. 6. In the view shown in FIG. 7, through holes 302 positioned adjacent to the slots 402(1) for containing the proxy host devices 120 are visible. The through holes 302 may provide a passage for cables and other connectors between the interior of the tray 216 and the exterior of the tray 216. For example, cables passing through the through holes 302 may engage a device within an adjacent slot 402(1). In some cases, cables passing through the through holes 302 may engage a device within a slot 402(1) with another device within the tray 216 or a device positioned outside of the tray 216. While FIG. 7 depicts the through holes 302 as generally round apertures, in other implementations, the through holes 302 may include slits or apertures having other shapes or sizes.

Figure 8:
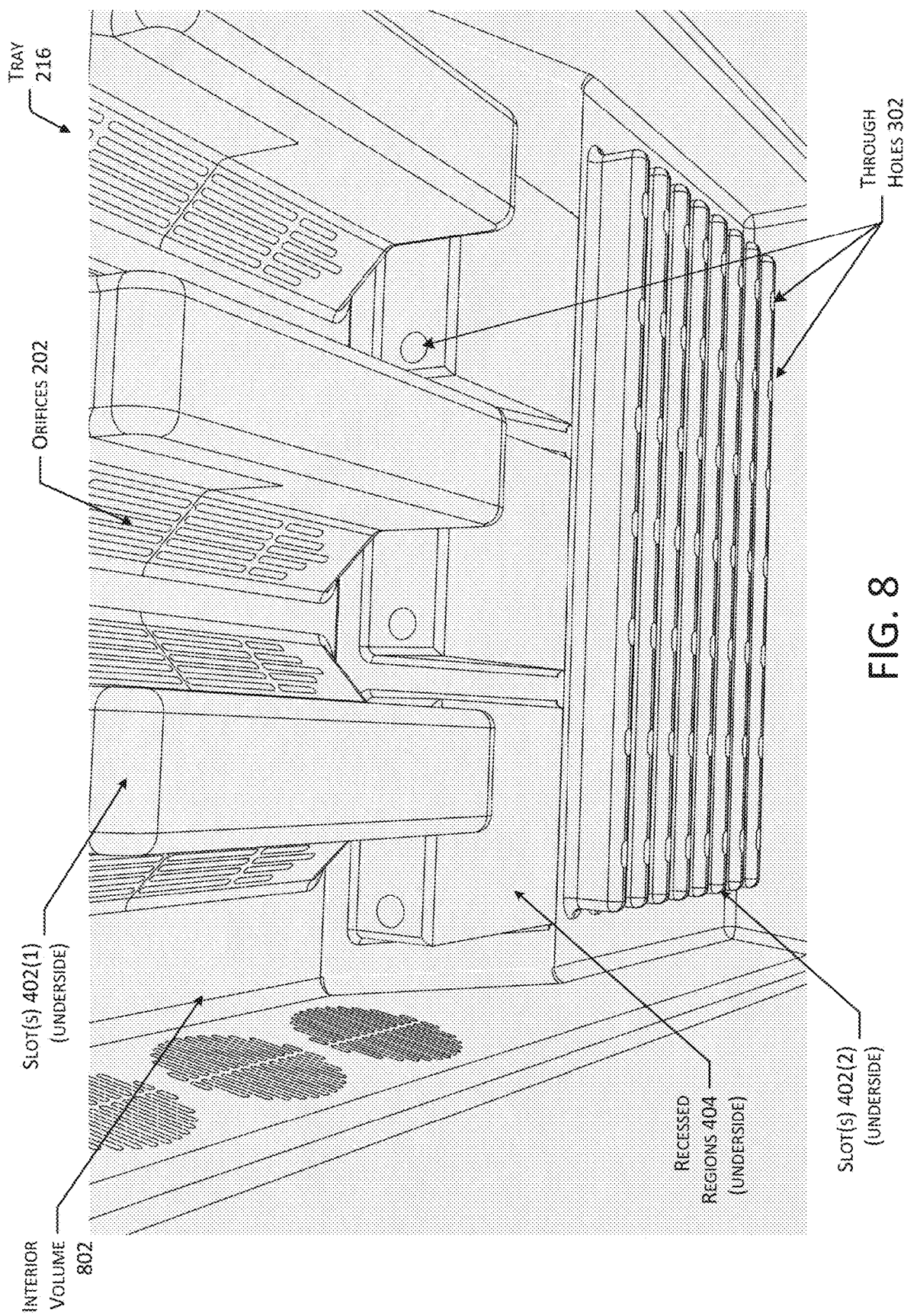
FIG. 8 depicts an underside view of the tray shown in FIGS. 6 and 7.

FIG. 8 depicts an underside view of the tray 216 shown in FIGS. 6 and 7. In the view shown in FIG. 8, the underside of the first set of slots 402(1), the second set of slots 402(2), and three recessed regions 404 are visible. The second set of slots 402(2) is shown having a series of through holes 302 that may function as cable access holes to provide passage for cables that engage a proxy access device 122 within the slot 402(2) to a proxy host device 120. While FIG. 8 shows the slots 402(2) each including multiple spaced through holes 302, in other implementations, a slit may be provided in one or more of the slots 402(2) in addition to or in place of the through holes 302.

An interior volume 802 may be defined by the underside of the tray 216 and a base surface, such as a base 210 of an enclosure 102 into which the tray 216 is placed. Devices such as power supplies for the proxy access devices 122, proxy host devices 120, or other devices in the tray 216 may be placed within the interior volume 802. The orifices 202 may provide for airflow to the interior volume 802 to facilitate cooling. In some implementations active cooling may be utilized, such as by using a fan or blower to force air through the interior volume 802. In some cases, the interior volume 802 may contain a fan, blower, or other cooling device.

Figure 9:
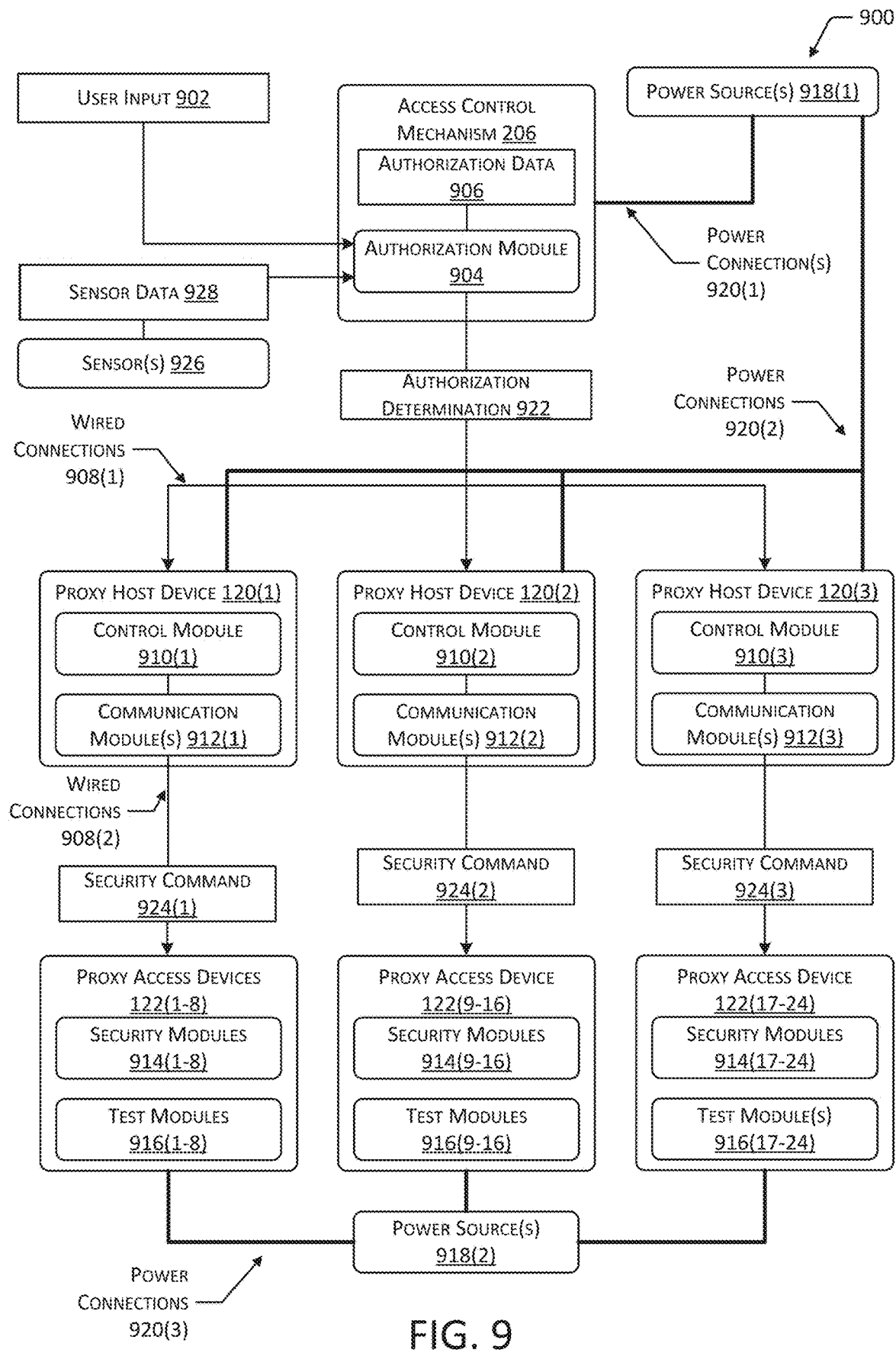
FIG. 9 is a block diagram illustrating one implementation of interactions between access control mechanisms, proxy host devices, and proxy access devices, and access control mechanisms of an enclosure.

FIG. 9 is a block diagram 900 illustrating one implementation of interactions between access control mechanisms 206, proxy host devices 120, and proxy access devices 122 of an enclosure 102. As described with regard to FIGS. 1-8, an enclosure 102 may be used to retain proxy host devices 120 and proxy access devices 122 during testing of an AUT 104. Other types of devices may be retained in an enclosure 102 for other purposes as well. Access control mechanisms 206 may be used to limit access to the interior of the enclosure 102. For example, user input 902 may be provided to an access control mechanism 206 in conjunction with an attempt to access the interior of the enclosure 102. Continuing the example, user input 902 may include entry of a pin number, password, gesture input, or other types of input using an input device associated with the access control mechanism 206. An authorization module 904 associated with the access control mechanism 206 may determine correspondence between the user input 902 and authorization data 906 that associates inputs with control actions. For example, the authorization data 906 may indicate valid passwords or other types of input, and correspondence between the user input 902 and the authorization data 906 may result in performance of a control action that includes actuating a closure mechanism to provide access to the interior of the enclosure 102.

The access control mechanism 206 may be in communication with one or more proxy host devices 120 within the enclosure 102. In some implementations, the access control mechanism 206 may communicate with one or more proxy host devices 120 via wired connections 908(1), such as a cable that engages a USB port of the proxy host device(s) 120. Each proxy host device 120 may in turn communicate with one or more proxy access devices 122, in some implementations via wired connections 908(2). As described previously, in some implementations, an enclosure 102 may contain three proxy host devices 120, each of which may communicate with eight proxy access devices 122. For example, FIG. 9 depicts a first proxy host device 120(1) that communicates with eight proxy access devices 122(1-8), a second proxy host device 120(2) that communicates with eight proxy access devices 122(9-16), and a third proxy host device 120(3) that communicates with eight proxy access devices 122(17-24). Each proxy host device 120 may include a control module 910 that may be used to determine commands or other types of signals to be sent to one or more of the proxy access devices 122. Each proxy host device 120 may also include one or more communication modules 912 for providing commands and other types of signals to proxy access devices 122, and for receiving data and other signals from the access control mechanism 206. Communication modules 912 may be configured for communication via the wired connections 908. In some implementations, communication modules 912 may also be configured for wireless communication. For example, if a disconnection of a wired connection 908 is determined, a proxy host device 120 may provide a wireless signal to one or more of the proxy access devices 122 to lock, deactivate, or delete data from the proxy access device 122. Wireless signals may include signals provided via a cellular network, a local area network, or other types of wireless communication between the proxy host device 120 and a proxy access device 122. In some implementations, the enclosure 102 may include a local area network accessible to one or more of the access control mechanism 206, the proxy host devices 120, or the proxy access devices 122 to enable signals to be exchanged between devices within the enclosure 102 in the event of a disconnection. The communication modules 912 may establish communications using one or more communication interfaces, such as network interfaces. Communication interfaces may enable computing devices, or components of computing devices, to communicate with other computing devices or components of the other computing devices.

Continuing the example, one or more of the proxy access devices 122 may include a security module 914. In one implementation, the security module 914 may include an application executing on the proxy access devices 122, such as a watchdog application. In response to a signal from a proxy host device 120, the security module 914 may cause an associated proxy access device 122 to enter a locked state, deactivate, delete data, and so forth. In some implementations, the security module 914 may lock, deactivate, or delete data from a proxy access device 122 without receiving a signal from a proxy host device 120, such as in response to disconnection of a wired connection 908, receipt of data indicating unauthorized access from the access control mechanism 206, or a lack of receipt of a periodic or continuous signal from the proxy host device 120, such as a "ping" or a "heartbeat" signal. Additionally, in some implementations, a proxy host device 120 may also include a security module 914 to lock, deactivate, or delete data from a proxy host device 120 in response to a signal from the access control mechanism 206 indicating an unauthorized access to the enclosure 102 or a disconnection of a wired connection 908. Proxy access devices 122 may also include test modules 916 for testing an AUT 104 or other hardware or software.

The enclosure 102 may include one or more power sources 918 that may be positioned within or external to the enclosure 102. For example, FIG. 9 depicts a one or more first power sources 918(1) that may provide power to the access control mechanism 206 using a first power connection 920(1) and one or more of the proxy host devices 120 using a second power connection 920(2). FIG. 9 also depicts one or more second power sources 918(2) that may provide power to one or more of the proxy access devices 122 using a third power connection 920(3). The arrangement of power sources 918 and power connections 920 shown in FIG. 9 is a single possible implementation, and any number of power sources 918 may provide power to any number of devices using any number of power connections 920. For example, multiple power sources 918 may provide power to a single device, a single power source 918 may provide power to multiple devices, and so forth. In some implementations, the access control mechanism 206 or the proxy host device(s) 120 may be configured to provide a signal to one or more other devices if disconnection of a power connection 920 is determined. For example, in response to disconnection from a power source 918, a proxy host device 120 may provide a signal to a proxy access device 122 to cause a security module 914 to lock, deactivate, or delete data from the proxy access device 122. A proxy host device 120 may also be locked, deactivated, or data may be deleted from a proxy host device 120 in response to disconnection of a power connection 920. In some implementations, a security module 914 may cause a proxy access device 122 to lock, deactivate, or delete data in response to disconnection of a power connection 920.

In operation, the access control mechanism 206 may receive user input 902 associated with an attempt to access the interior of the enclosure 102. Based on correspondence between the user input 902 and the authorization data 906, the authorization module 904 may generate an authorization determination 922 and provide the authorization determination 922 to the proxy host device(s) 120. Each proxy host device 120 that receives the authorization determination 922 may provide a security command 924 to the proxy access devices 122 associated with the proxy host device 120. If the user input 902 corresponds to the authorization data 906, the authorization determination 922 may indicate a valid attempt to access the interior of the enclosure 102. In such a case, the security commands 924 provided to the proxy access devices 122 may suspend or disable the security modules 914 to enable access to the proxy access devices 122, such as to add or remove devices from the enclosure 102 or access data stored on the devices. In some implementations a log or other type of record indicating the valid access attempt may be generated. The log may include information regarding the state of devices within the enclosure 102 before and subsequent to the access attempt. For example, if one or more devices are removed from the enclosure 102 during the valid access, the log may associate removal of the devices with the user that accessed the enclosure 102.

If the access control mechanism 206 determines an unauthorized attempt to access the enclosure 102, the authorization determination 922 and security commands 924 may indicate the unauthorized access attempt. In response to the unauthorized access attempt, one or more proxy host devices 120 or proxy access devices 122 may be locked, deactivated, or data may be deleted from the devices. Detection of an unauthorized access attempt may include determining that a closure mechanism of the enclosure 102 has been opened without providing user input 902 that corresponds to the authorization data 906. Detection of an unauthorized access attempt may also include determining disconnection of a wired connection 908 between devices or a power connection 920 between a device and a power source 918. In some implementations, the enclosure 102 may include one or more sensors 926, such as a motion sensor, force sensor, accelerometer, gyroscope, position sensor, an electrical mesh integrated within one or more surfaces of the enclosure 102, and so forth. The sensor(s) 926 may generate sensor data 928 indicative of an attempt to access the enclosure 102. For example, the sensor(s) 926 may detect destruction or deformation of a wall of the enclosure 102, an impact or other force that contacts the enclosure 102, movement or tilting of the enclosure 102 toward one or more threshold positions or at a rate that exceeds a threshold rate, and so forth. In response to the sensor data 928, the access control mechanism 206 may generate an authorization determination 922 indicative of an unauthorized access attempt. In other implementations, one or more of the proxy host devices 120 or proxy access devices 122 may perform a control action, such as locking, deactivating, or deleting data from a device, in response to detecting a disconnection of a wired connection 908 or power connection 920, or in response to sensor data 928, independent of signals from the access control mechanism 206 or other devices.

Figure 10:
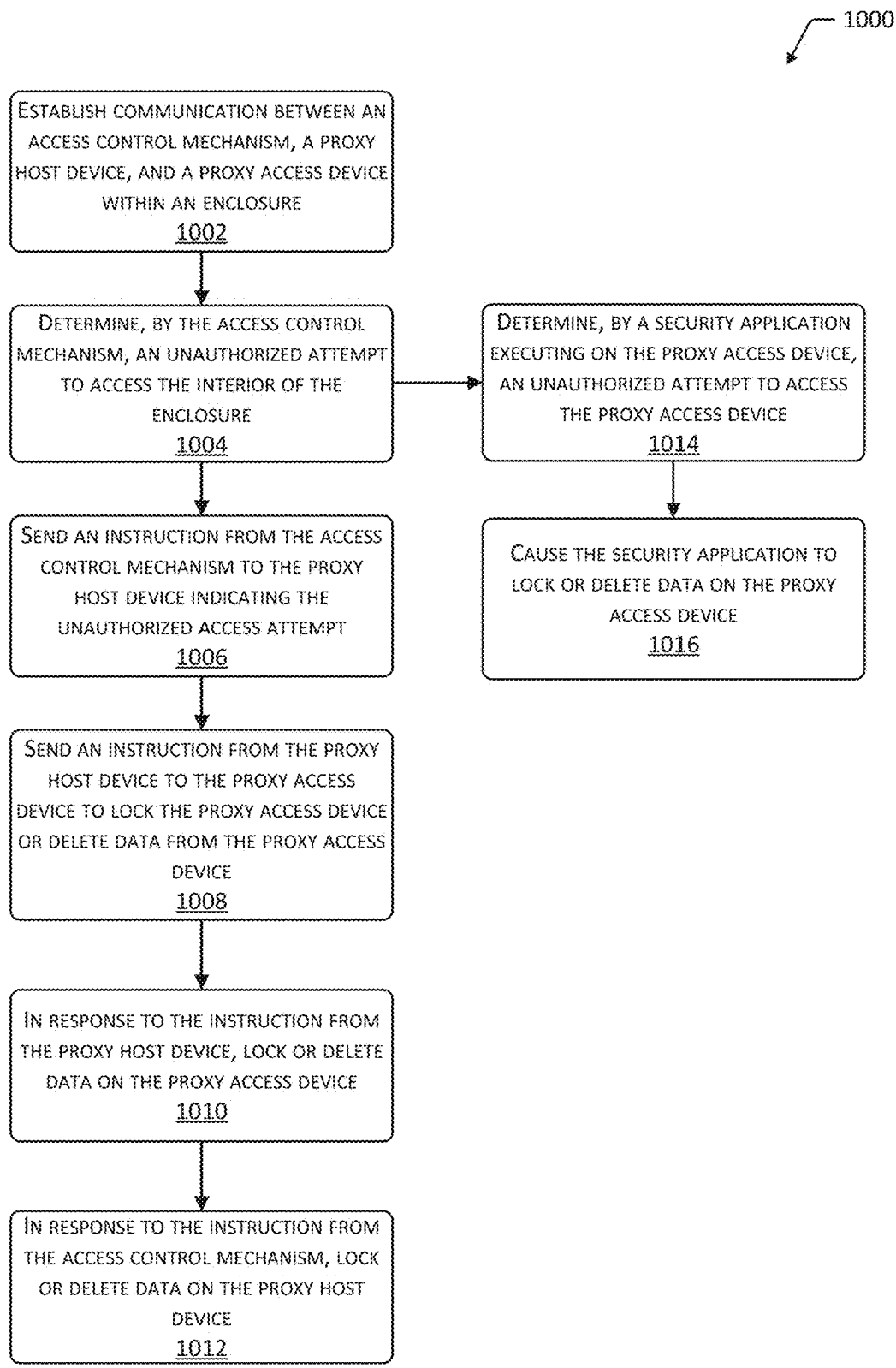
FIG. 10 is a flow diagram illustrating an implementation of a method for controlling access to devices stored in an enclosure.

FIG. 10 is a flow diagram 1000 illustrating an implementation of a method for controlling access to devices stored in an enclosure 102. At 1002, communication may be established between an access control mechanism 206, a proxy host device 120, and a proxy access device 122 within an enclosure 102. In some implementations, communication may be established using wired connections 908, such as by engaging a cable between a USB port of a proxy host device 120 and one or more proxy access devices 122. In other implementations, communication may include use of one or more wireless protocols. In still other implementations, devices within the enclosure 102 may communicate using a variety of methods. For example, a proxy access device 122 and proxy host device 120 may be configured to communicate using both a wired connection 908 and a wireless protocol.

At 1004, the access control mechanism 206 may determine an unauthorized attempt to access the interior of the enclosure 102. An unauthorized access attempt may include actuation of a closure mechanism of the enclosure 102 in the absence of user input 902 that corresponds to authorization data 906. An unauthorized access attempt may also include disconnection of a wired connection 908 or disconnection of a power connection 920 between a device and a power source 918. An unauthorized access attempt may additionally be determined based on sensor data 928. For example, one or more sensors 926 in communication with the access control mechanism 206 or one or more devices within the enclosure 102 may detect an impact, destruct, deformation, movement, a rate of movement, or a change in orientation that may indicate an unauthorized access attempt. As another example, the sensor(s) 926 may include one or more cameras that may determine the presence of an individual within a threshold distance of the enclosure 102 or an access attempt performed by the individual. As yet another example, the sensors 926 may include one or more microphones that may determine audible sound having one or more characteristics indicative of an access attempt.

At 1006, an instruction may be sent from the access control mechanism 206 to the proxy host device 120 indicating the unauthorized access attempt. For example, an access control mechanism 206 may send a signal to one or more proxy host devices 120 via a wired connection 908 or a wireless method of communication. In other implementations, a proxy host device 120 may detect an unauthorized access attempt independent of the access control mechanism 206, such as by receiving sensor data 928 or detecting disconnection of a wired connection 908 or power connection 920 directly. In still other implementations, a proxy host device 120 may provide a signal to the access control mechanism 206, other proxy host devices 120, or one or more proxy access devices 122 indicative of an unauthorized access attempt. For example, in response to determining a disconnection of a power connection 920 or wired connection 908, a proxy host device 120 may provide a signal to other devices.

At 1008, an instruction may be sent from the proxy host device 120 to the proxy access device 122 to lock the proxy access device 122 or delete data from the proxy access device 122. For example, in response to determining the unauthorized access attempt, either independently or from the access control mechanism 206, a proxy host device 120 may provide a security command 924 to a proxy access device 122. In other implementations, a proxy access device 122 may receive an instruction from the access control mechanism 206, sensor data 928 from one or more sensors 926, or may determine an access attempt directly, such as by detecting disconnection of a wired connection 908 or power connection 920.

In some implementations, the instructions described at 1006 and 1008 may be provided using wired connections 908 or using one or more wireless protocols. For example, in response to determining disconnection of a wired connection 908 between a proxy host device 120 and a proxy access device 122, the proxy host device 120 may provide an instruction to lock or delete data from the proxy access device 122 using a wireless communication protocol.

At 1010, in response to the instruction from the proxy host device 120, the proxy access device 122 may be locked, data may be deleted from the proxy access device 122, or the proxy access device 122 may both be locked and have data deleted therefrom. At 1012, in response to the instruction from the access control mechanism 206, the proxy host device 120 may be locked, data may be deleted from the proxy host device 120, or the proxy host device 120 may both be locked and have data deleted therefrom. As described previously, in other implementations, the proxy host devices 120 and proxy access devices 122 may be locked or have data deleted therefrom independent of instructions received from other devices.

In some implementations, a proxy access device 122 may determine an unauthorized access attempt in the absence of a signal from a proxy host device 120 or access control mechanism 206. For example, at 1014, a security application executing on the proxy access device 122, such as a security module 914 described with regard to FIG. 9, may determine an unauthorized attempt to access the proxy access device 122. Continuing the example, the security application may include a "watchdog" application that receives periodic or continuous signals from a proxy host device 120 or access control mechanism 206. In response to input indicative of an authorized access attempt, the security application may be suspended, deactivated, or may permit access to or removal of the proxy access device 122. However, if an authorized access attempt does not occur, the security application may detect a disconnection of the proxy access device 122 from the proxy host device 120, access control mechanism 206, or power source 918. Alternatively, the proxy access device 122 may determine an absence of an expected signal from the proxy host device 120 or access control mechanism 206. In response to this determination, the security application may cause the proxy access device 122 to perform one or more functions. For example, at 1016, the security application may be used to lock the proxy access device 122 or delete data from the proxy access device 122.

Figure 11A:
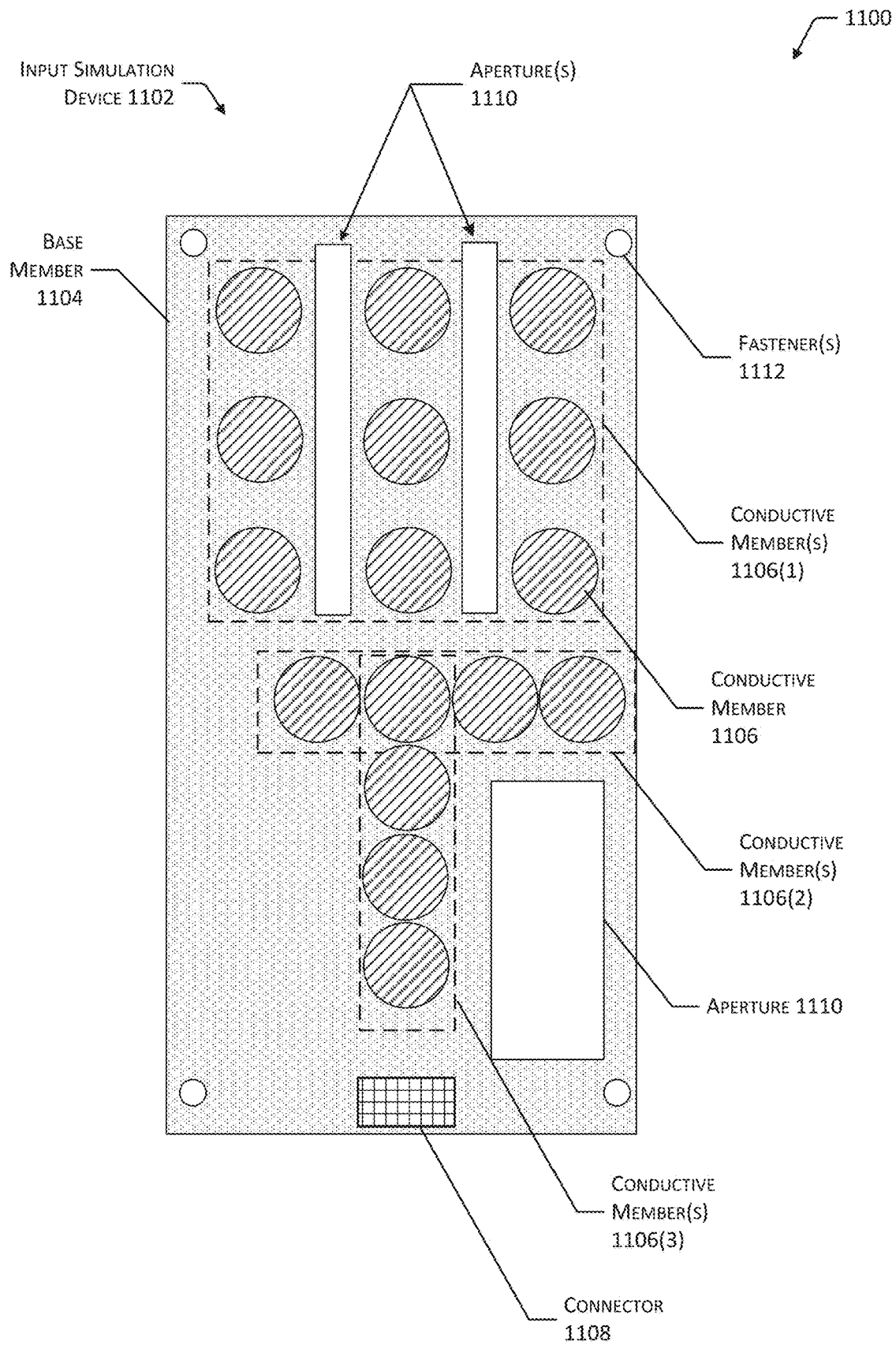
FIG. 11A is a diagram depicting an implementation of an input simulation device that may be used to provide simulated touch input to devices stored within an enclosure.

FIG. 11A is a diagram 1100 depicting an implementation of an input simulation device 1102 that may be used to provide simulated touch input to devices stored within an enclosure 102. For example, a proxy access device 122 within the enclosure 102 may include a touch sensor, such as a touchscreen display. In some cases, performance of certain types of operations using the proxy access device 122 may require providing touch input or simulated touch input to the touch sensor. For example, a particular type of smartphone may require touch input to the touch sensor, such as entry of a pin number, password, or gesture input, to unlock the smartphone when it is locked, before instructions may be provided to the smartphone to cause performance of other operations. As another example, testing the functionality of a proxy access device 122 under certain conditions may include performing operations using simulated touch input to the touch sensor. To enable input to be provided to a touch sensor of a device within the enclosure 102, the input simulation device 1102 may be placed in association with the touch sensor, such as in contact with or proximate to the touch sensor.

For example, FIG. 11A depicts the input simulation device 1102 including a base member 1104, such as a printed circuit board (PCB). PCBs may include flexible circuit boards or rigid fiberglass circuit boards. In other implementations, other substrate materials may be used. The base member 1104 is shown having a generally planar, rectangular shape. For example, the base member 1104 may have a shape that corresponds to the shape of a rectangular touchscreen display of a smartphone or tablet. One or more conductive members 1106 may be positioned on the base member 1104. Each conductive member 1106 may be configured to cause a change in capacitance to a region of a capacitive touch sensor proximate to the conductive member 1106, upon receipt of an electrical current, voltage, or other type of input, which may simulate the effect of a human touch to the region of a capacitive touch sensor. While FIG. 11A depicts the input simulation device 1102 having sixteen conductive members 1106, any number of conductive members 1106 may be included on an input simulation device 1102. For example, an input simulation device 1102 may include a single conductive member 1106 used to provide touch or tap inputs. In some implementations, multiple conductive members 1106 may be arranged in a grid or array, such as by providing the input simulation device 1102 with rows and columns of conducive members 1106. Use of conductive members 1106 that are spaced closely together may enable the simulation of precise touch inputs to a touch sensor, such as touch inputs to user-selected (e.g., arbitrary) locations, random locations, and so forth. In some implementations, multiple conductive members 1106 may be used to simulate a single touch input. For example, four small conductive members 1106 that are placed closely together may correspond to the size of a touch input provided by a single finger. Use of an input simulation device 1102 having conductive members 1106 that are smaller than the size of a single touch input may enable touch inputs to be provided with greater resolution.

In one implementation, the base member 1104 may be placed over the touch sensor of a device such that one or more edges of the base member 1104 are within a threshold distance of corresponding edges of the touch sensor. The base member 1104 and the position of the conductive members 1106 may be arranged such that placing the base member 1104 over the touch sensor in this manner may position one or more of the conductive members 1106 over or proximate to specific regions of the touch sensor. For example, FIG. 11A depicts a first set of conductive members 1106(1) positioned in locations that may correspond to the locations of a numeric keypad that may be presented on a touchscreen display. In other implementations, other arrangements of conductive members 1106 may be used, such as arrangements that corresponds to letters or other characters of a keyboard presented on a touchscreen display, the position of icons, buttons, or other controls within the display, or the position of one or more capacitive buttons or other capacitive controls on a device. While FIG. 11A depicts a rectangular input simulation device 1102, the input simulation device 1102 may have any shape or dimensions. For example, an input simulation device 1102 may include a base member 1104 that is smaller than the touch sensor over which it is placed, larger than the touch sensor, a shape other than a rectangular, such as a line, an L shape, a triangular shape, a round shape, and so forth.

In some implementations, conductive members 1106 may be arranged to simulate a gesture input, such as a swipe gesture by a user. For example, FIG. 11A depicts a second set of conductive members 1106(2) arranged in a horizontal line. The conductive members 1106(2) may cause a change in capacitance that simulates a left-to-right swipe gesture by first actuating the leftmost conductive member 1106(2), then actuating the adjacent conducive member 1106(2) while ceasing actuation of the first conducive member 1106(2), and progressing in a sequential manner toward the rightmost conductive member 1106(2). Actuating the conductive members 1106(2) in the opposite order may simulate a swipe gesture that moves from right to left. A third set of conductive members 1106(3) may be arranged in a vertical line, such that sequentially using the conductive members 1106(3) to cause a change in capacitance may simulate a swipe gesture that moves from top to bottom or from bottom to top.

The input simulation device 1102 may include one or more connectors 1108, such as a USB port, which may be used to couple the input simulation device 1102 to a controller or one or more other devices. In other implementations, the input simulation device 1102 may include a controller. For example, the base member 1104 may include a circuit board or may include wiring, circuitry, or other conductive elements that enable electrical communication between a controller coupled to the base member 1104 and one or more of the conductive members 1106. A controller may selectively cause individual conductive members 1106 or subsets of conductive members 1106 to cause a change in capacitance to regions of a touch sensor to provide simulated touch input to the regions. The input simulation device 1102 may also include one or more apertures 1110, which may include apertures in the base member 1104. Including apertures 1110 within the base member 1104 may reduce the capacitance provided to a touch sensor by the input simulation device 1102 itself when none of the conductive members 1106 are actuated. Apertures 1110 may also facilitate alignment between the input simulation device 1102 and the touch sensor of a device within the enclosure. For example, portions of the touch sensor or other parts of the device may be visible through an aperture 1110 when positioning the base member 1104 over or otherwise in association with the touch sensor.

Figure 11B:
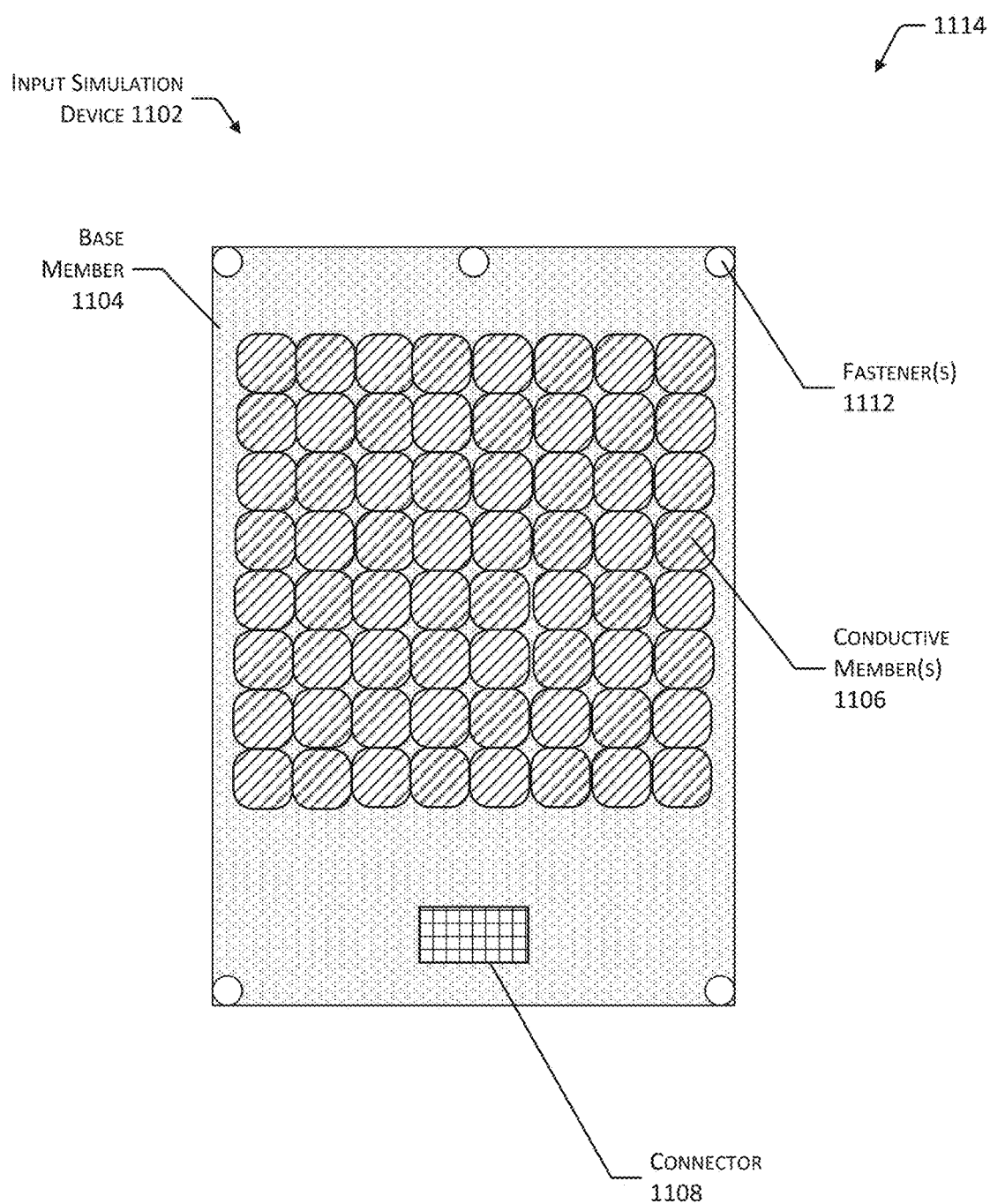
FIG. 11B is a diagram depicting an implementation of an input simulation device that may be used to provide simulated touch input to devices stored within an enclosure.

In other implementations, other configurations of conductive members 1106 may be used. For example, FIG. 11B is a diagram 1114 depicting an implementation of an input simulation device 1102 with rows and columns of conductive members 1106 spaced closely together in a grid arrangement to enable simulation of precise touch inputs to a large number of locations on a touch sensor. For example, the input simulation device 1102 is shown having a base member 1104 with eight rows and eight columns of conductive members 1106 arranged thereon. In other implementations, other numbers and arrangements of conductive members 1106 may be used. The depicted arrangement of conductive members 1106 may enable simulated touch input to any location or combination of locations of a touch sensor that are proximate to a conductive member 1106 to be provided. In some cases, input may be provided using multiple conductive members 1106 in succession, such as to simulate a horizontal, vertical, or diagonal swipe gesture, a pinch-zoom gesture, or gesture inputs having other shapes.

Input simulation devices 1102, such as those shown in FIG. 11A, FIG. 11B, or other configurations of input simulation devices 1102, may be secured to a device that includes a touch sensor using one or more fasteners 1112 or adhesives, a force or interference fit, and so forth. Additionally, in some implementations, an input simulation device 1102 may be associated with a housing configured to engage the input simulation device 1102 to an associated device having a touch sensor.

Figure 12:
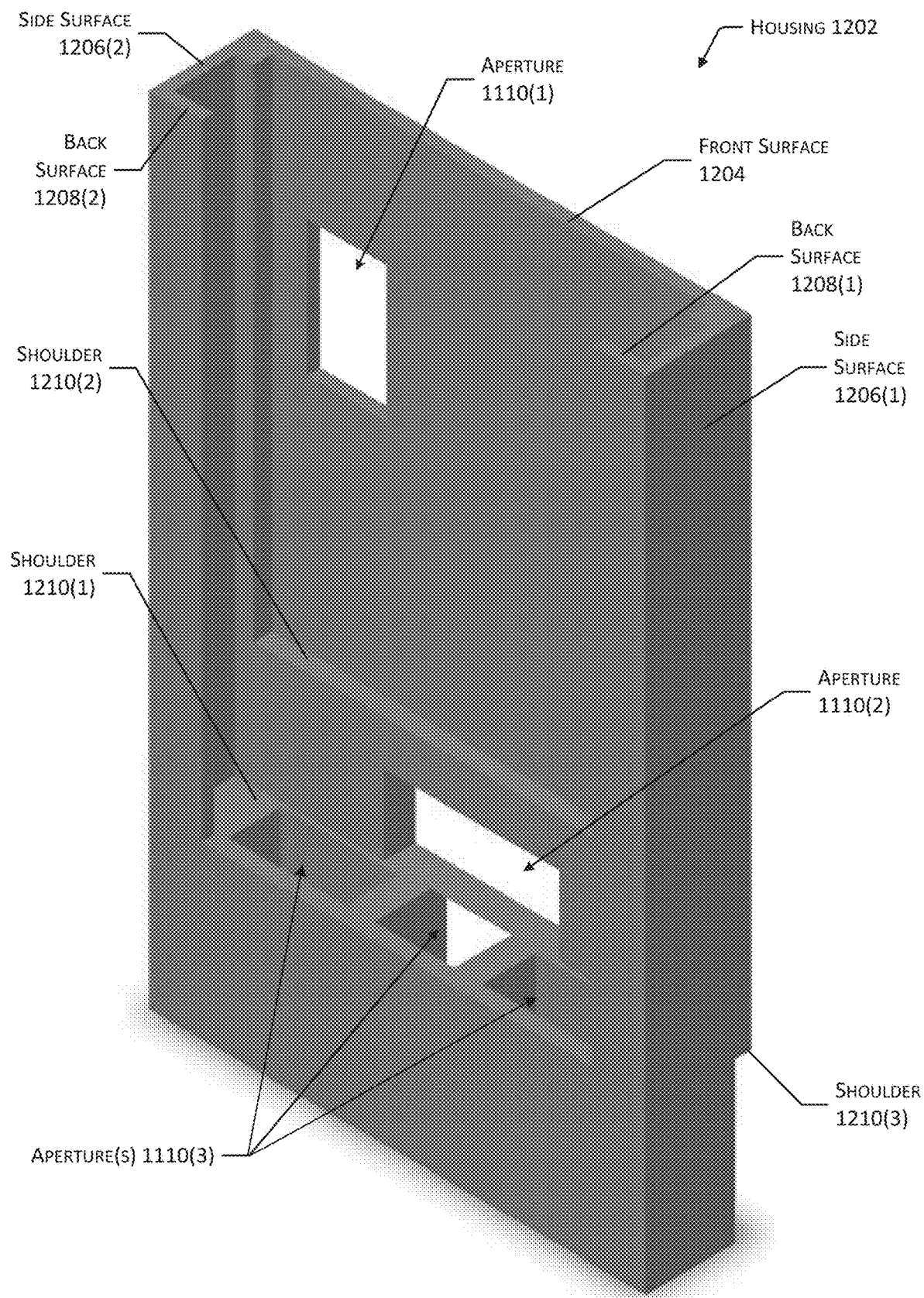
FIG. 12 is a front view of a housing that may retain an input simulation device in association with a proxy access device within an enclosure.
Figure 13:
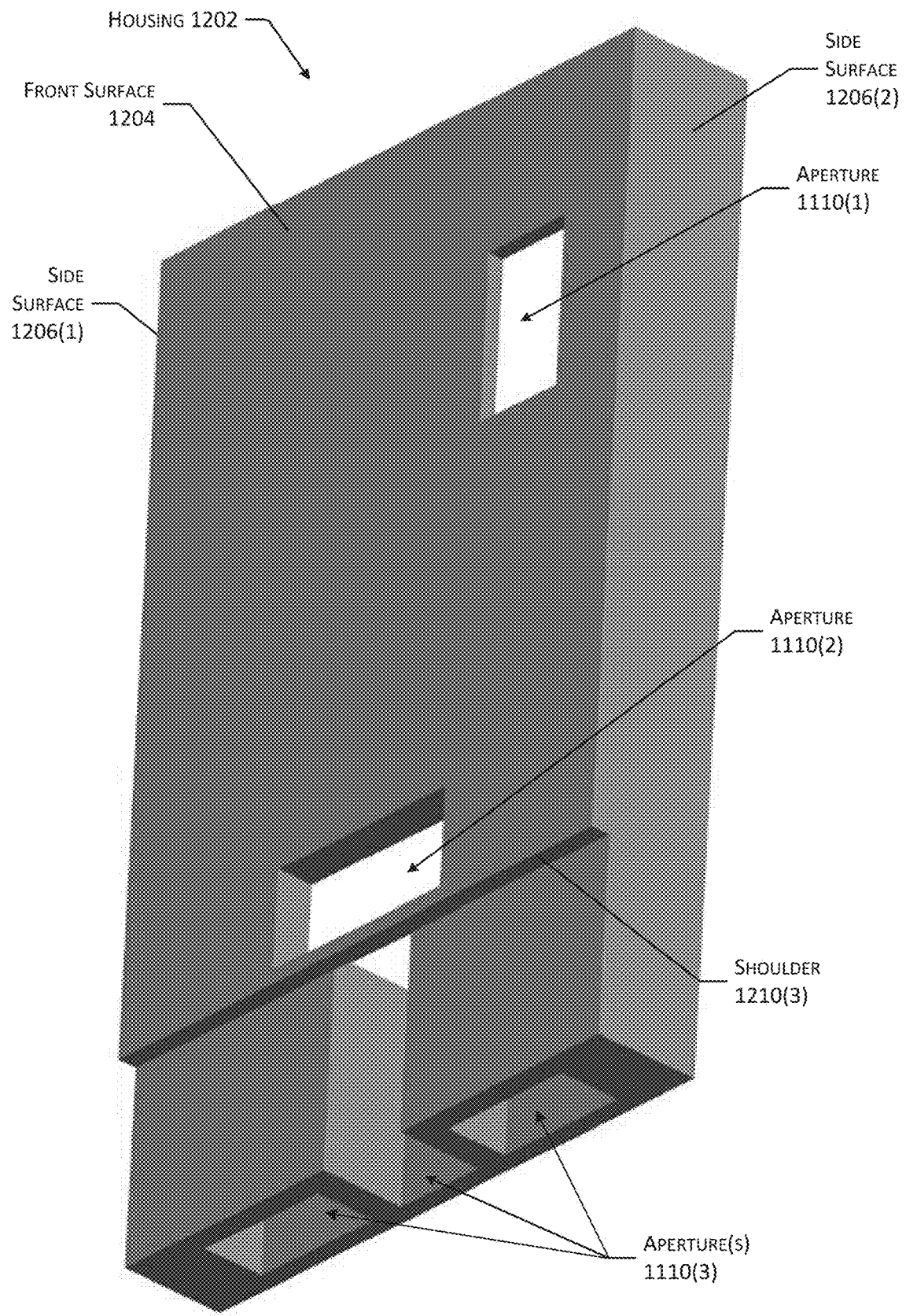
FIG. 13 is a back view of the housing of FIG. 12.

FIG. 12 is a front view of a housing 1202 that may retain an input simulation device 1102 in association with a proxy access device 122 within an enclosure 102. FIG. 13 is a back view of the housing 1202 of FIG. 12. In one implementation, the housing 1202 may have a generally rectangular shape. The housing 1202 may be used to retain a proxy access device 122 having at least one dimension smaller than a dimension of the housing 1202. For example, a smartphone may have a rectangular shape with dimensions smaller than the rectangular shape of the housing 1202, enabling the smartphone to be placed within the housing 1202. The housing 1202 may retain the proxy access device 122, proximate to an input simulation device 1102, such as the input simulation device 1102 shown in FIG. 11. In other implementations, the housing 1202 may have other shapes to accommodate other devices and input simulation devices 1102.

The housing 1202 may include a front surface 1204 having a first side surface 1206(1) and a second side surface 1206(2) extending from opposite ends of the front surface 1204. A first back surface 1208(1) may extend from the first side surface 1206(1), such that a first end of the first side surface 1206(1) is contiguous with the front surface 1204 and a second end of the first side surface 1206(1) is contiguous with the first back surface 1208(1). A second back surface 1208(2) may similarly extend from the second side surface 1206(2). The front surface 1204, side surfaces 1206, and back surfaces 1208 may define a generally rectangular volume that may contain a proxy access device 122 or another type of device. For example, the front of a device, such as the portion of a device that includes a touchscreen display, may face the front surface 1204, while the side edges of the device may each be proximate to a respective side surface 1206 of the housing 1202. A lower edge of the device may be proximate to a first shoulder 1210(1) within the housing 1202.

The housing 1202 may also include a second shoulder 1210(2) formed in the interior thereof to define a space that may contain the input simulation device 1102. For example, the input simulation device 1102 may be positioned within the housing 1202 such that the edges of the input simulation device 1102 are proximate to the edges of the shoulder 1210(2). Placement of the input simulation device 1102 in this manner may position the input simulation device 1102 between a proxy access device 122 that rests on the first shoulder 1210(1) and the front surface 1204 of the housing 1202.

A third shoulder 1210(3) is shown formed on the exterior of the housing 1202, in the front surface 1204, which may facilitate placement of the housing 1202 within a slot 402 of a tray 216 or other complementary volume within an enclosure 102. For example, a lower portion of the housing 1202 may be inserted into a volume formed in the enclosure 102 such that the third shoulder 1210(3) abuts or is proximate to a surface of the enclosure 102 adjacent to the volume into which the lower portion of the housing 1202 is placed.

The housing 1202 may include various apertures 1110 formed therein. For example, a first aperture 1110(1) and a second aperture 1110(2) are shown extending through the front surface 1204. The apertures 1110 may accommodate the position of input and output devices associated with a proxy access device 122 within the housing 1202. For example, the first aperture 1110(1) may accommodate the position of a camera, while the second aperture 1110(2) may accommodate the position of one or more microphones or speakers of the device. FIGS. 12 and 13 also depict multiple apertures 1110(3) formed in a lower end of the housing 1202, which may accommodate the passage of cables and other types of connectors that may engage the input simulation device 1102 or proxy access device 122 within the housing 1202. In some implementations, one or more of the apertures 1110 may define a contiguous space with one or more other apertures 1110. For example, FIG. 13 depicts a lower aperture 1110 having an interior space that is contiguous with the space behind the second aperture 1110(2). Contiguous apertures 1110 may enable cables or other objects to extend through multiple apertures 1110, or may enable a portion of a proxy access device 122 or input simulation device 1102 within the housing 1202 to be engaged from different sides or angles, which in some cases may enable a housing 1202 to accommodate different types and shapes of proxy access devices 122 and input simulation devices 1102. Additionally, in some implementations, the apertures 1110(3) may be sized to prevent passage of a portion of a cable or other conductor therethrough. For example, the aperture 1110(3) may permit passage of a wire portion of a cable but prevent passage of a connector portion of a cable, such that the connector portion is supported by the shoulder 1210(1). In such a case, when a proxy access device 122 or other device that engages a cable extending through an aperture 1110(3) is disconnected from the cable, the connector portion of the cable may remain accessible and supported by the shoulder 1210(1) rather than passing through the aperture 1110(3). Supporting the cable in this manner may enable devices to be removed, exchanged, added, and replaced efficiently by engaging devices to the supported portions of the cables.

Figure 14:
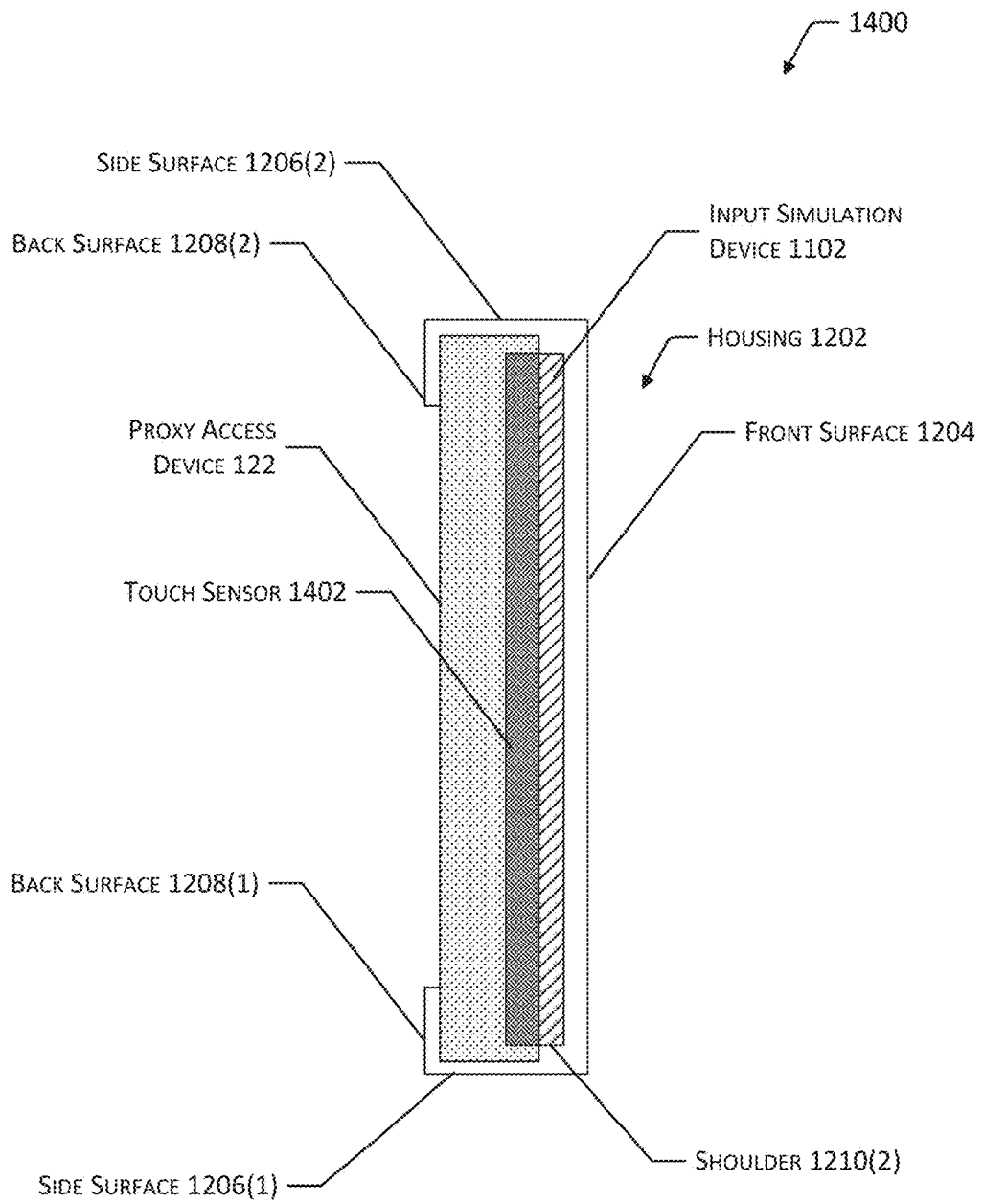
FIG. 14 is a diagram depicting one implementation of an arrangement of a proxy access device, input simulation device, and housing.

FIG. 14 is a diagram 1400 depicting one implementation of an arrangement of a proxy access device 122, input simulation device 1102, and housing 1202. As described with regard to FIGS. 12 and 13, the housing 1202 may define an interior space for containing a proxy access device 122 such that the touch sensor 1402 of the proxy access device 122 faces the front surface 1204 of the housing 1202. The input simulation device 1102 may be positioned between the touch sensor 1402 and the front surface 1204 such that conductive members 1106 of the input simulation device 1102 are positioned in association with selected locations of the touch sensor 1402. The edges of an interior shoulder 1210(2) within the housing 1202 may define a space that contains the input simulation device 1102. The side surfaces 1206 of the housing 1202 may limit movement of the side edges of the proxy access device 122, while the back surfaces 1208 may limit movement of the proxy access device 122 away from the front surface 1204.

Figure 15:
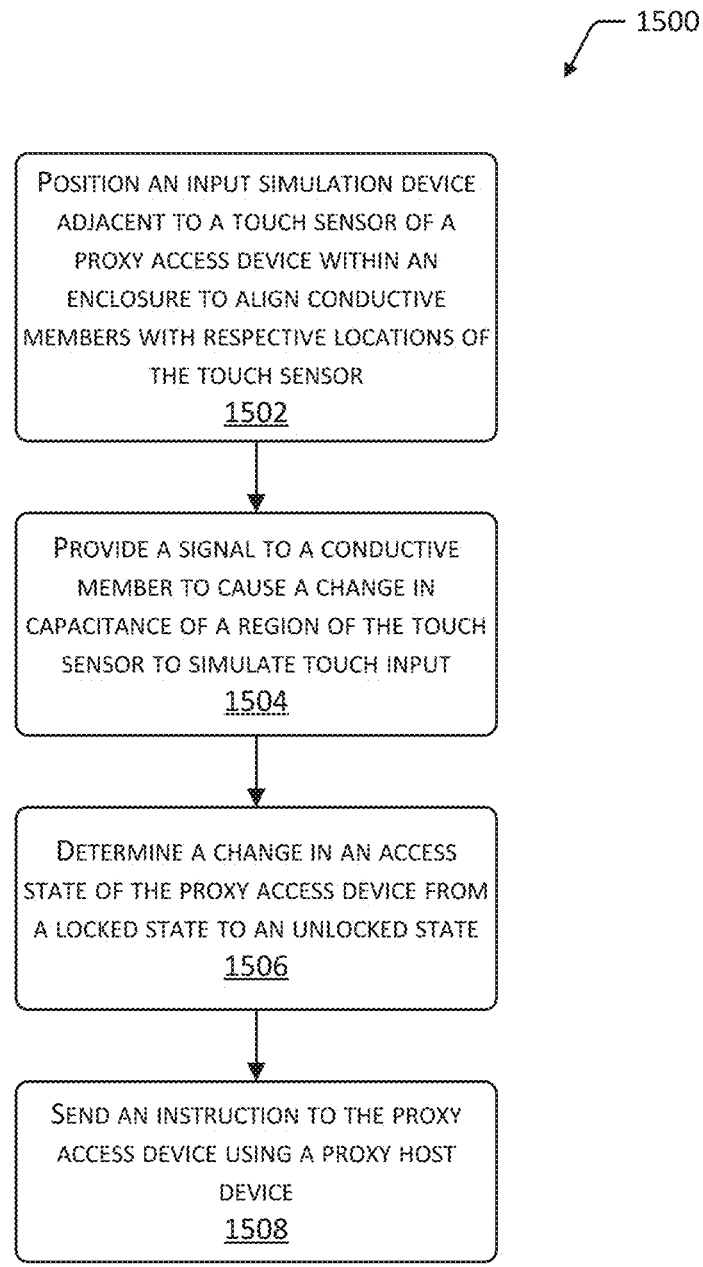
FIG. 15 is a flow diagram illustrating an implementation of a method for providing simulated touch input to a touch sensor of a device stored in an enclosure.

FIG. 15 is a flow diagram 1500 illustrating an implementation of a method for providing simulated touch input to a touch sensor 1402 of a device stored in an enclosure 102. At 1502, an input simulation device 1102 may be positioned adjacent to a touch sensor 1402 of a proxy access device 122 within an enclosure 102 to align conductive members 1106 of the input simulation deice 1102 with respective locations of the touch sensor 1402. For example, as described with regard to FIGS. 12-14, an input simulation device 1102 may be mechanically engaged with a surface of a proxy access device 122 to position conducive members 1106 proximate to selected locations of a touch sensor 1402. In some implementations, a housing 1202 may retain the input simulation device 1102 and proxy access device 122 in proximity to one another. For example, the input simulation device 1102 may be positioned between a front surface 1204 of the housing 1202 and a touch sensor 1402 of the proxy access device 122. The position of internal shoulders 1210, side surfaces 1206, back surfaces 1208, or other features of the housing 1202 may facilitate alignment between the conductive members 1106 of the input simulation device 1102 and selected locations of the touch sensor 1402.

At 1504, a signal may be provided to a conductive member 1106 of the input simulation device 1102 to cause a change in capacitance of a region of the touch sensor 1402 proximate to the conductive member 1106. The change in capacitance may simulate touch input to one or more locations of the touch sensor 1402. In some implementations, touch input may be provided using a single conductive member 1106 to simulate a single tap, short press, long press, or other type of touch input provided to a single location of the touch sensor 1402. Touch input may also be simulated at locations corresponding to independent, capacitive buttons. For example, a smartphone may include a touchscreen positioned adjacent to a separate capacitive "home" button. In some cases, the capacitance may be changed multiple times, such as to simulate a double-tap gesture or other type of pattern that includes tap gestures. In other implementations, touch input may be provided using multiple conductive members 1106 sequentially, such as to simulate a swipe gesture or a gesture input having a selected shape, or to selectively provide tap inputs to locations of the touch sensor 1402 corresponding to letters, numbers, icons, or other controls, such as to enter a password. In still other implementations, touch input may be provided using multiple conductive members 1106 simultaneously, such as to simulate gestures that may utilize multiple digits, such as a pinch-to-zoom gesture, a tap or swipe gesture using multiple fingers, or other types of multi-touch gestures.

At 1506, a change in an access state of the proxy access device 122 from a locked state to an unlocked state may be determined. For example, the simulated touch input provided using the conductive members 1106 may be used to unlock a proxy access device 122 so that other operations may be performed using the proxy access device 122 by sending signals to the device. In other implementations, simulated touch input may be used to perform other operations using the proxy access device 122 besides changing the access state of the device.

At 1508, an instruction may be sent to the proxy access device 122 using a proxy host device 120. For example, after causing the proxy access device 122 to transition to an unlocked access state, the proxy access device 122 may be controllable to perform various operations using control signals, software, and so forth. In other implementations, the proxy access device 122 may perform operations independent of instructions from a proxy host device 120, or the proxy access device 122 may receive instructions from other sources.

Figure 16:
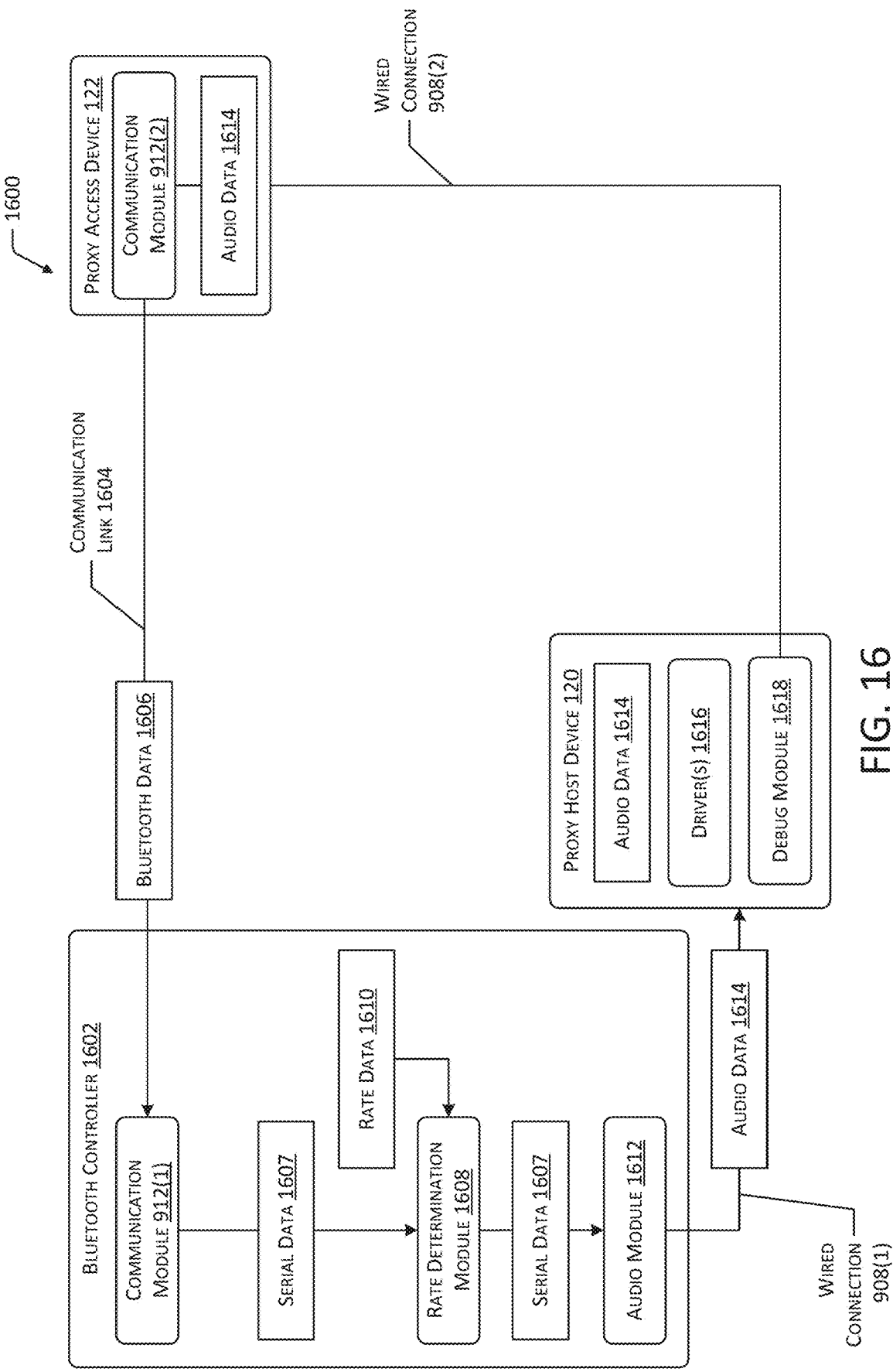
FIG. 16 is a block diagram illustrating one implementation of interactions between a Bluetooth controller, a proxy access device, and a proxy host device.

FIG. 16 is a block diagram 1600 illustrating one implementation of interactions between a Bluetooth controller 1602, a proxy access device 122, and a proxy host device 120. As described previously, in some implementations, a control device, such as a Bluetooth controller 1602 may be retained in an enclosure 102 with one or more proxy host devices 120 or proxy access devices 122. The Bluetooth controller 1602 may establish Bluetooth communication links 1604 with one or more proxy access devices 122. The proxy access devices 122 may then exchange Bluetooth data 1606 via Bluetooth communication links 1604 with the Bluetooth controller 1602 when testing an AUT 104 or for other purposes. For example, the Bluetooth controller 1602 may simulate a particular input or output device for exchanging Bluetooth data 1606 with the proxy access device 122. Continuing the example, the Bluetooth controller 1602 may simulate the presence of a set of Bluetooth headphones or a Bluetooth speaker in communication with the proxy access device 122 that receives Bluetooth data 1606 from the proxy access device 122. Test data indicative of the transmission of Bluetooth data 1606 may be generated based on the transmission of the Bluetooth data 1606 from the proxy access device 122 to the Bluetooth controller 1602 without outputting audio or generating other types of output based on the transmitted Bluetooth data 1606. For example, when generating test data indicative of the transmission of Bluetooth data 1606, neither the proxy access device 122 nor the Bluetooth controller 1602 may generate or output audio. Analysis of the transmission of Bluetooth data 1606 using a proxy access device 122, proxy host device 120, or Bluetooth controller 1602, without causing audio output to be generated, or by suppressing generation of audio, may prevent unauthorized individuals from determining the data being exchanged or tested by overhearing audio output. For example, preventing the output of audio may prevent sounds that may reveal the data being exchanged from being overheard by individuals proximate to the enclosure 102. While FIG. 16 depicts the proxy access device 122 transmitting Bluetooth data 1606 to the Bluetooth controller 1602 via the communication link 1604, in other implementations, the Bluetooth controller 1602 may function as a source of Bluetooth data 1606 for the proxy access device 122, such as by simulating a microphone or other audio data source, and may transmit Bluetooth data 1606 to the proxy access device 122. For example, test data indicative of the receipt of Bluetooth data 1606 by the proxy access device 122 may be generated.

In some implementations, the Bluetooth controller 1602 may be used to control the sample rate, the transmit power, the channel, the encryption, or other characteristics associated with the transmission of the Bluetooth data 1606 or other data exchanged with the Bluetooth controller 1602. The Bluetooth controller 1602 may also be used to control a Bluetooth mode of the proxy access device 122 and the format or other characteristics of data exchanged with the Bluetooth controller 1602. In some cases, the sample rates, data formats, and other characteristics of different Bluetooth devices may be incompatible. For example, the sample rate or format used by a Bluetooth headset may not be compatible with the sample rate or format associated with the USB input of a computing device. Use of the Bluetooth controller 1602 to convert between various sample rates and other data characteristics may enable the exchange of data between various types of devices to be tested, simulating a variety of compatibility and interoperability scenarios. In some cases, a rate determination module 1608, which may include a sample rate converter, may be used to modify the sample rate of data exchanged between the Bluetooth controller 1602 and a proxy access device 122 and between the Bluetooth controller 1602 and a proxy host device 1602. For example, a communication module 912(1) of the Bluetooth controller 1602, such as a Bluetooth transceiver, may receive Bluetooth data 1606 from the proxy access device 122. The received data may be transmitted, as serial data 1607, to a rate determination module 1608 of the Bluetooth controller 1602. Serial data 1607 may include data having a format that is interoperable with the Bluetooth controller 1602, such as the I2S serial bus interface standard. The rate determination module 1608 may determine correspondence between one or more characteristics of the serial data 1607 or of the proxy access device 122 and rate data 1610, which may associate characteristics with corresponding sample rates. Based on the characteristics of the serial data 1607 or proxy access device 122, a sample rate for transmission of the data to the proxy host device 120 may be determined. In some implementations, the rate for transmission of data to the proxy host device 120 may be determined based on user input or one or more settings or configurations. For example, transmission of data to a proxy access device 122 or proxy host device 120 or receipt of data from a proxy access device 122 or proxy host device 120 may be tested at a selected sample rate. In addition to determining a sample rate for the exchange of data with the Bluetooth controller 1602, the rate determination module 1608 or one or more other modules may determine other characteristics of the exchange of data, such as a transmission power, a Bluetooth mode, one or more format characteristics of the exchanged data, and so forth. In some implementations, the Bluetooth controller 1602 may be used to reset, power cycle, or reconfigure particular communication links 1604 or devices in the enclosure 102, while maintaining other communication links 1604. For example, the Bluetooth controller 1602 may maintain a communication link 1604 with a proxy host device 120 while resetting a communication link 1604 used by a proxy access device 122. As another example, the Bluetooth controller 1602 may maintain a communication link 1604 with one or more first proxy access devices 122 while resetting a communication link 1604 with a second proxy access device 122. Additionally, in some implementations, the Bluetooth controller 1602 may be used to provide commands to the proxy access device 122 using the communication link 1604, such as commands associated with remote control devices, headsets, microphones, automotive audio systems, and so forth. For example, commands may include control commands to pause or resume the output of audio, commands to access a contact list or send or receive communications, commands that simulate the press of a button or other control, and so forth.

In some implementations, the Bluetooth controller 1602 may engage proxy host devices 120, as well as other devices, using wired connections 908. For example, the Bluetooth controller 1602 may include a set of USB connections. In one implementation, the Bluetooth controller 1602 may include a plurality of connections. For example, the Bluetooth controller 1602 may include eight USB connections. In other implementations, other numbers or other types of connections may be used. The Bluetooth controller 1602 may include a communication module 912(1) for establishing a Bluetooth communication link 1604 with a communication module 912(2) of one or more proxy access devices 122. For example, the communication module 912(1) may establish a communication link 1604 using a Bluetooth pairing process.

A processor or other type of controller may be used to control the functions of the Bluetooth controller 1602 and may be engaged with power sources 918 and other devices within the enclosure 102. Power connectors may be used to provide power to the Bluetooth controller 1602, to ground the Bluetooth controller 1602, and so forth. In some implementations, the Bluetooth controller may include one or more buttons or other types of controls, which may be used to perform various functions, such as resetting the Bluetooth controller 1602, initiating or canceling Bluetooth pairing processes, changing one or more settings or configurations, and so forth.

Instructions provided to the Bluetooth controller 1602 may be used to change various characteristics of the Bluetooth data 1606 exchanged with proxy access devices 122. For example, the Bluetooth controller 1602 may exchange data at a sample rate or transmit power selected by a user or selected automatically based on characteristics of the data to be exchanged or of the proxy access device 122. The Bluetooth controller 1602 may also control a Bluetooth mode associated with the exchange of data, such as use of Bluetooth 2.0 features when exchanging data versus Bluetooth 3.0 features.

As described previously, an AUT 104 may be used to cause a proxy access device 122 to exchange Bluetooth data 1606 with other devices. In some implementations, Bluetooth data 1606 may include data provided to a speaker or other type of output device for output or received from a microphone or other type of input device. The Bluetooth controller 1602 may function as a source or sink of Bluetooth data 1606, or may simultaneously function as both a source and sink, such as when performing bidirectional exchanges of data. For example, a communication module 912(1) of the Bluetooth controller 1602 may establish a Bluetooth communication link 1604 with a communication module 912(2) of the proxy access device 122 such as by pairing the Bluetooth controller 1602 with the proxy access device 122. While FIG. 16 depicts a single proxy access device 122, a Bluetooth controller 1602 may establish a communication link 1604 with multiple proxy access devices 122. From the perspective of the proxy access device 122 the Bluetooth controller 1602 may then function as a speaker, microphone, headset, or other device when exchanging Bluetooth data 1606 with the proxy access device 122. For example, the Bluetooth controller 1602 may receive Bluetooth data 1606 from the proxy access device 122 without generating audible output, and may generate or send preexisting Bluetooth data 1606 to the proxy access device 122 without receiving audible input. Continuing the example, by suppressing generation of audio by a proxy access device 122, access to data exchanged with the proxy access device 122 by unauthorized individuals that could overhear generated audio may be prevented. In some cases, the Bluetooth controller 1602 may exchange data with a proxy host device 120 or another device. For example, a host device or another source of data may provide data to the Bluetooth controller 1602, which may function as a bridge between the host device and the proxy access device 122 and transmit the data to the proxy access device 122 via the communication link 1604.

As described previously, the rate determination module 1608 associated with the Bluetooth controller 1602 may determine a sample rate for use when exchanging the Bluetooth data 1606. The sample rate may be determined based on characteristics of the Bluetooth data 1606 or proxy access device 122 or based on user input or an existing setting or configuration. For example, when testing bidirectional exchanges of Bluetooth data 1606, a lower sample rate may be used than when testing unidirectional transmissions of Bluetooth data 1606. In some implementations, the rate determination module 1608 or one or more other modules may determine other characteristics of the data exchanged with the proxy access device 122 or characteristics of the transmission, such as the format of the data or the transmit power of the transmission.

An audio module 1612 of the Bluetooth controller 1602 may exchange data with the proxy host device 120. For example, the audio module 1612 may convert audio data 1614 received from the proxy host device 120 via a USB port to serial data 1607 having a format that is interoperable with the Bluetooth controller 1602, such as I2S or SPDIF. The rate determination module 1608 may then determine a sample rate for transmission of data to the proxy access device 122 and in some implementations, other characteristics of the transmission. The data may then be transmitted to the proxy access device 122 as Bluetooth data 1606 via the communication link 1604. In other cases, Bluetooth data 1606 may be received by the Bluetooth controller 1602, from the proxy access device 122, using the communication module 912(1). The Bluetooth data 1606 provided by the proxy access device 122 may include audio data 1614 stored on the proxy access device 122 or received by the proxy access device 122 from the proxy host device 120 or another source. For example, audio data 1614 may be streamed over a network to or from the proxy access device 122. Streamed data may be received and processed incrementally using stream processing techniques, without accessing all of the data associated with a complete file. The rate of the received data may be converted by the rate determination module 1608, then the audio module 1612 may convert the serial data 1607 to audio data 1614 having a format that may be transmitted to the proxy host device 120 via a wired connection 908(1), such as a USB format that may be transmitted to a USB port of the proxy host device 120.

The proxy host device 120 may include one or more drivers 1616 associated with operation of the Bluetooth controller 1602 and the transmission and receipt of audio data 1614. For example, the proxy host device 120 may execute a version of the Advanced Linux Sound Architecture (ALSA). The proxy host device 120 may also include one or more debug modules 1618 which may be used to provide signals to the proxy access device 122, change one or more configurations or control operations of the proxy access device 122, receive data from the proxy access device 122 indicative of operations, and so forth.

While FIG. 16 describes use of a Bluetooth controller 1602 to facilitate exchanges of Bluetooth data 1606 by the proxy access device 122, in other implementations, controllers for use of other communication protocols may be used. For example, a proxy access device 122 may communicate with a proxy host device 120 using a first protocol, and with a control device using a second protocol.

Figure 17:
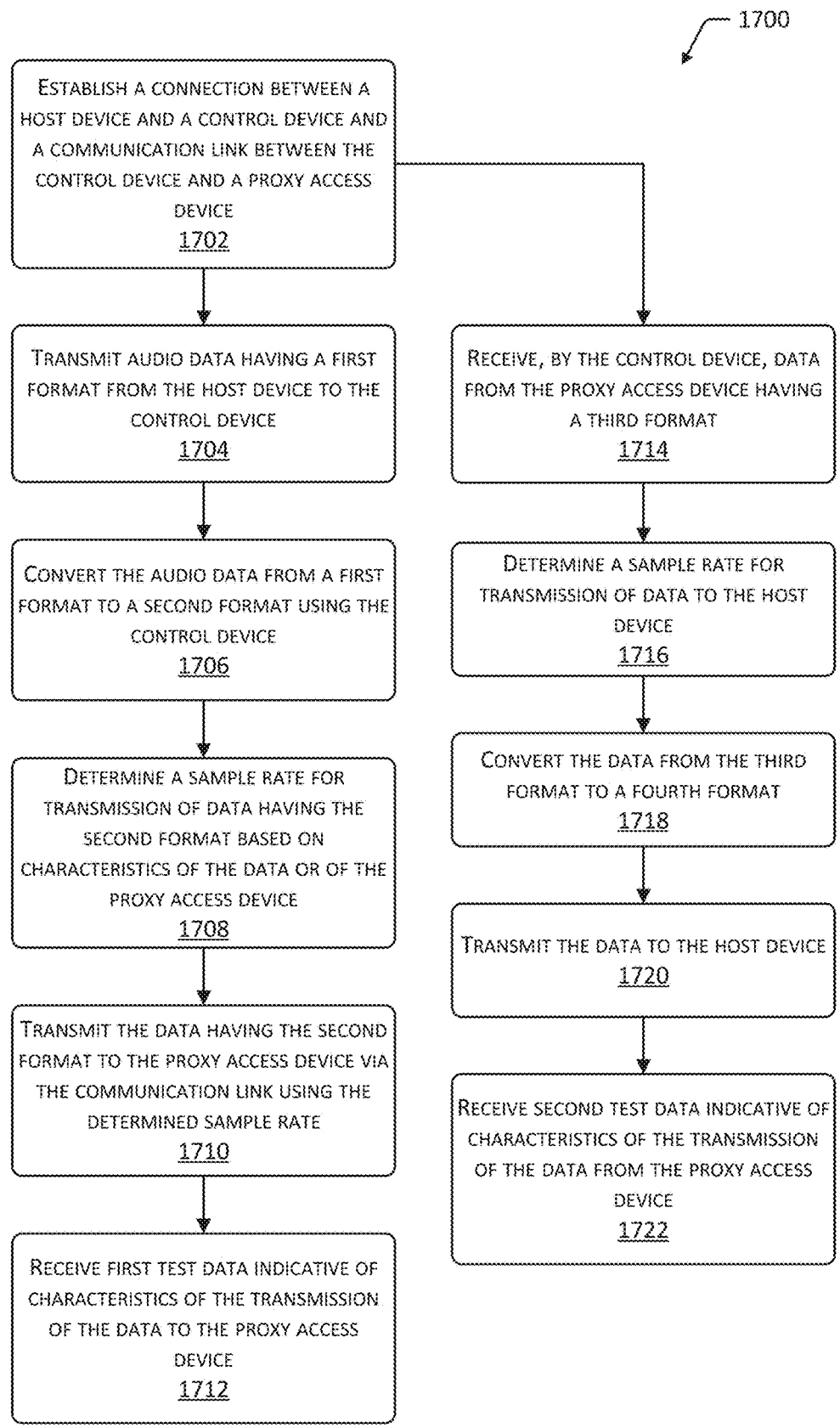
FIG. 17 is a flow diagram illustrating an implementation of a method for testing the exchange of data for a proxy access device using a communication protocol.

FIG. 17 is a flow diagram 1700 illustrating an implementation of a method for testing the exchange of data for a proxy access device 122 using a communication protocol. At 1702, a connection between a host device and a control device may be established. A communication link 1604 between the control device and a proxy access device 122 may also be established. In some implementations, the communication protocol may include Bluetooth and the communication link 1604 may include a Bluetooth communication link.

At 1704, audio data 1614 having a first format may be transmitted from the host device to the control device. For example, the host device may store or generate audio data 1614 to be tested by the proxy access device 122. As another example, audio data 1614 may be streamed to the host device or proxy access device 122 using one or more networks 112, such as from a workstation 108 that communicates with the host device or proxy access device 122 via the network(s) 112.

At 1706, the audio data 1614 may be converted from a first format to a second format using the control device. For example, as described with regard to FIG. 16, an audio module 1612 may convert audio data 1614 received via a wired connection 908 to serial data 1607 associated with the I2S format or another format interoperable with the control device.

At 1708, a sample rate for transmission of data having the second format may be determined based on characteristics of the data or of the proxy access device 122. For example, the control device may include a rate determination module 1608 or other type of rate converter that may control a sample rate at which Bluetooth data 1606 or another type of data is transmitted. The sample rate may be determined based on the type of data, quantity of data, or other characteristics of the data to be sent to the proxy access device 122, the operations to be performed by the proxy access device 122, hardware or software components of the proxy access device 122, and so forth. In some implementations, one or more other characteristics of the format of the data to be transmitted or the transmission of the data may also be determined. For example, a particular transmit power or mode associated with the Bluetooth protocol may be determined based on the characteristics of the data, the devices, or based on user input.

At 1710, the data having the second format may be transmitted to the proxy access device 122 via the communication link 1604 using the determined sample rate. At 1712, first test data indicative of characteristics of the transmission of the data to the proxy access device 122 may be received. For example, the proxy access device 122 may transmit data indicative of receipt of the data to the host device, a management server 118, or one or more other devices. As another example, the proxy access device 122 or control device may generate test data indicative of the characteristics of the exchange of data, and one or more other devices may receive the test data from the proxy access device 122 or the control device.

In other implementations, data may be transmitted from the proxy access device 122 to the control device, as shown in blocks 1714 through 1720. In some cases, the use of the proxy access device 122 to both send and receive data may be tested. In other cases, only one of such capabilities may be tested. At 1714, the control device may receive data from the proxy access device 122. The data received from the proxy access device 122 may have a third format. For example, the proxy access device 122 may provide Bluetooth data 1606 to a Bluetooth controller 1602, with a format and sample rate suitable for output using a speaker, headphones, or other type of output device.

At 1716, a sample rate for transmission of data to the host device may be determined by the control device. In some implementations, other characteristics of the data or the transmission of the data may also be determined. At 1718, the data received from the proxy access device 122 may be converted from the third format to a fourth format. For example, data that is received from the proxy access device 122 may undergo a similar conversion process that the data transmitted to the proxy access device 122 underwent. Continuing the example, data received from the proxy access device 122 may be converted from a format that is interoperable with a Bluetooth controller 1602, such as I2S, to a format suitable for transmission to a USB controller of the host device.

At 1720, the data may be transmitted to the host device. At 1722, second test data indicative of characteristics of the data from the proxy access device 122 may be received.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
an enclosure for securing devices during testing of applications executed on the devices, the enclosure having an interior;
a first mechanism to control physical access to the interior of the enclosure; and
a first device within the enclosure, wherein the first device comprises:
a first communication interface configured to communicate with a second device external to the enclosure;
a second communication interface configured to communicate with a third device within the enclosure;
one or more memories storing computer-executable instructions; and
one or more hardware processors to execute the computer-executable instructions to:
establish communication between the second device and the third device;
determine a disconnection between a power source and one or more of:
the first mechanism, the first device, or the third device; and
in response to the disconnection, one or more of:
send a first instruction using the second communication interface, wherein the first instruction is configured to lock the third device;
send a second instruction using the second communication interface, wherein the second instruction is configured to delete first data stored on the third device; or
delete second data stored on the first device.

2. The system of claim 1, further comprising:
a sensor associated with a surface of the enclosure; and
computer-executable instructions to: receive, from the sensor, a signal indicative of one or more of: deformation of the surface or destruction of the surface, wherein one or more of sending the first instruction, sending the second instruction, or deleting the second data is in response to the signal.

3. The system of claim 1, further comprising computer-executable instructions to:
determine operation of the first mechanism to access the interior of the enclosure; and
determine a mismatch between input to the first mechanism and authorization data that is associated with an authorized attempt to access the interior of the enclosure, wherein one or more of sending the first instruction, sending the second instruction, or deleting the second data is in response to the mismatch.

4. The system of claim 1, wherein the second device is in communication with the third device using a wired connection, and the computer-executable instructions to determine the disconnection include computer-executable instructions to determine a disconnection of the wired connection between the second device and the third device.

5. The system of claim 1, further comprising:
a circuit board positioned adjacent to a touch sensor of the third device, wherein the circuit board includes a first conductive member positioned proximate to a first location of the touch sensor; and
computer-executable instructions to: provide a first signal to the circuit board to cause a change in capacitance, using the first conductive member, to provide input to the first location of the touch sensor.

6. The system of claim 1, further comprising:
a Bluetooth controller in communication with the third device via one or more Bluetooth protocols; and
computer-executable instructions to:
send a third instruction using the second communication interface, wherein the third instruction is configured to cause the third device to one or more of: receive or transmit Bluetooth data using the one or more Bluetooth protocols;
determine one or more characteristics associated with one or more of: the Bluetooth data or a transmission of the Bluetooth data; and
send a fourth instruction using the second communication interface, wherein the fourth instruction is configured to cause one or more components of the third device to one or more of: transmit data or generate output based on the one or more characteristics.

7. A system comprising:
an enclosure for securing devices during testing of applications executed on the devices, the enclosure having an interior;
a first mechanism to control physical access to the interior of the enclosure;
a first device in the interior, wherein the first device includes a touch sensor and a first communication interface configured to communicate with a second device;
a first conductive member positioned in association with a first location of the touch sensor;
a second conductive member positioned in association with a second location of the touch sensor; and
one or more hardware processors associated with the second device, to execute computer-executable instructions to:
establish communication between the first device and the second device;
send a first instruction to change a capacitance associated with the first conductive member to provide first input, using the first conductive member, to the first location of the touch sensor;
send a second instruction to change a capacitance associated with the second conductive member to provide second input, using the second conductive member, to the second location of the touch sensor, wherein the first input and the second input comprise a sequence of inputs to cause the first device to perform a function;
determine an unauthorized attempt to access the interior of the enclosure; and
in response to the unauthorized attempt to access the interior send a third instruction to the first device to cause the first device to one or more of: change an access state to a locked state, or delete data stored on the first device.

8. The system of claim 7, further comprising computer-executable instructions to:
after providing the first instruction, determine a change in the access state of the first device from the locked state to an unlocked state; and
send a fourth instruction to the first device to cause the first device to exchange data, via one or more networks, with one or more of: the second device, or a third device external to the enclosure.

9. The system of claim 7, wherein the touch sensor has a first border, the system further comprising:
a base member having a second border within a threshold distance of the first border, wherein: the base member is positioned adjacent to the touch sensor, the first conductive member is mounted to the base member, and a position of the first border within the threshold distance of the second border positions the first conductive member proximate to the first location of the touch sensor.

10. The system of claim 9, wherein: the base member comprises a planar surface and an edge extending from the planar surface, the planar surface contacts a first side of the first device, the edge contacts a second side of the first device, and the base member and the edge retain the touch sensor proximate to the first conductive member.

11. The system of claim 7, further comprising computer-executable instructions to:
determine, using the first mechanism, one or more of: a first signal indicative of deformation of a surface of the enclosure, or a second signal indicative of a mismatch between third input to the first mechanism and authorization data that is associated with an authorized attempt to access the interior;
wherein the unauthorized attempt is determined based on the one or more of the first signal or the second signal.

12. The system of claim 7, wherein the first device communicates with one or more of the second device or a third device external to the enclosure using one or more networks associated with a first communication protocol, the system further comprising:
a control device in communication with the first device via a second communication protocol that differs from the first communication protocol; and
computer-executable instructions to:
cause the first device to one or more of: receive or transmit data using the second communication protocol;
determine a first characteristic for the data associated with the second communication protocol based on a second characteristic of one or more of: the data or the first device; and
cause one or more components of the first device to one or more of: transmit data associated with the first characteristic or generate output associated with the first characteristic.

13. A system comprising:
an enclosure for securing devices during testing of applications executed on the devices, the enclosure having an interior;
a first mechanism to control physical access to the interior of the enclosure;
a first device within the enclosure, wherein the first device comprises: a first communication interface configured to communicate with a second device using a first communication protocol; and a second communication interface configured to communicate with a control device using a second communication protocol;
one or more memories storing computer-executable instructions; and
one or more hardware processors to execute the computer-executable instructions to:
determine a sample rate for exchange of first data using the second communication protocol based at least in part on time data determined from a sample clock;
cause the first device to exchange the first data using the sample rate and the second communication protocol;
determine one or more characteristics associated with the first data;
cause a component of one or more of the second device or the control device to one or more of: transmit the first data or generate output associated with the one or more characteristics;
cause the first device to exchange second data, using the first communication protocol, with a third device external to the enclosure;
determine an unauthorized attempt to access the interior of the enclosure; and
in response to the unauthorized attempt to access the interior send a first instruction to the first device, using one or more of the second device or the control device, to cause the first device to one or more of: change an access state to a locked state, or delete data stored on the first device.

14. The system of claim 13, wherein the second communication protocol includes a Bluetooth protocol, the system further comprising computer-executable instructions to:
control one or more of: a mode associated with the Bluetooth protocol, or a transmit power associated with the Bluetooth protocol;
wherein the first data is exchanged using the one or more of the mode or the transmit power.

15. The system of claim 13, further comprising computer-executable instructions to:
determine, using the first mechanism, one or more of: deformation of a surface of the enclosure, or a mismatch between input to the first mechanism and authorization data that is associated with an authorized attempt to access the interior;
wherein the unauthorized attempt is determined in response to the one or more of the deformation or the mismatch.

16. A system comprising:
an enclosure for securing devices during testing of applications executed on the devices, the enclosure having an interior;
a first mechanism to control physical access to the interior of the enclosure;
a first device within the enclosure;
a second device within the enclosure;
a circuit board positioned adjacent to a touch sensor of the second device, wherein the circuit board includes a first conductive member positioned proximate to a first location of the touch sensor;
one or more memories storing computer-executable instructions; and
one or more hardware processors to execute the computer-executable instructions to:
provide a first signal to the circuit board to cause a change in capacitance, using the first conductive member, to provide input to the first location of the touch sensor;
determine an unauthorized attempt to access the interior of the enclosure; and
in response to the unauthorized attempt to access the interior, one or more of:
change an access state of one or more of the first device or the second device to a locked state; or
delete data stored on the one or more of the first device or the second device.

17. A system comprising:
an enclosure for securing devices during testing of applications executed on the devices, the enclosure having an interior;
a first mechanism to control physical access to the interior of the enclosure;
a first device in the interior, wherein the first device includes a touch sensor having a first border;
a base member positioned adjacent to the touch sensor, where the base member has a second border within a threshold distance of the first border;
a first conductive member mounted to the base member, wherein a position of the second border within the threshold distance of the first border positions the first conductive member proximate to a first location of the touch sensor; and
one or more hardware processors to execute computer-executable instructions to:
send a first instruction to change a capacitance associated with the first conductive member to provide first input, using the first conductive member, to the first location of the touch sensor;
determine an unauthorized attempt to access the interior of the enclosure; and
in response to the unauthorized attempt to access the interior send a second instruction to the first device to cause the first device to one or more of: change an access state to a locked state, or delete data stored on the first device.

18. The system of claim 17, wherein: the base member comprises a planar surface and an edge extending from the planar surface, the planar surface contacts a first side of the first device, the edge contacts a second side of the first device, and the base member and the edge retain the touch sensor proximate to the first conductive member.

19. A system comprising:
an enclosure for securing devices during testing of applications executed on the devices, the enclosure having an interior;
a first mechanism to control physical access to the interior of the enclosure;
a first device within the enclosure, wherein the first device comprises: a first communication interface configured to communicate with a second device using a first communication protocol; and a second communication interface configured to communicate with a control device using a second communication protocol;
one or more memories storing computer-executable instructions; and
one or more hardware processors to execute the computer-executable instructions to:
establish a communication link between the control device and one or more of the first device or a fourth device within the enclosure using the second communication protocol;
cause the first device to exchange first data using the second communication protocol;
determine one or more characteristics associated with the first data;
cause a component of one or more of the second device or the control device to one or more of: transmit the first data or generate output associated with the one or more characteristics;
reset a communication link between the second device and the control device while maintaining the communication link between the control device and the one or more of the first device or the fourth device;
determine an unauthorized attempt to access the interior of the enclosure; and
in response to the unauthorized attempt to access the interior send a first instruction to cause one or more of the first device, the second device, or the control device to one or more of: change an access state to a locked state, or delete data.

20. A system comprising:
an enclosure for securing devices during testing of applications executed on the devices, the enclosure having an interior;
a first mechanism to control physical access to the interior of the enclosure;
a first device within the enclosure, wherein the first device comprises: a touch sensor; a first communication interface configured to communicate with a second device using a first communication protocol; and a second communication interface configured to communicate with a control device using a second communication protocol;
a conductive member positioned proximate to a location of the touch sensor;
one or more memories storing computer-executable instructions; and
one or more hardware processors to execute the computer-executable instructions to:
cause a change in capacitance associated with the conductive member, wherein the change in capacitance provides input to the location of the touch sensor; and
determine a change in an access state of the first device from a locked state to an unlocked state;
in response to the unlocked state, cause the first device to exchange first data using one or more of the first communication protocol or the second communication protocol;
determine an unauthorized attempt to access the interior of the enclosure; and
in response to the unauthorized attempt to access the interior send a first instruction to the first device, using one or more of the second device or the control device, to cause the first device to one or more of: change an access state to the locked state, or delete data stored on the first device.

* * * * *

UNITED STATES PATENT AND TRADEMARK OFFICE
CERTIFICATE OF CORRECTION

| | |
|---|---|
| PATENT NO. | : 11,625,506 B1 |
| APPLICATION NO. | : 16/593847 |
| DATED | : April 11, 2023 |
| INVENTOR(S) | : Severin Smith et al. |

It is certified that error appears in the above-identified patent and that said Letters Patent is hereby corrected as shown below:

In the Claims

Column 32, Claim 7, Line 30:
Currently reads: "includes a touch sensor and a first communication"
Where it should read: -- includes: a touch sensor and a first communication --.

Column 34, Claim 13, Line 15:
Currently reads: "interior send a first instruction to the first device,"
Where it should read: -- interior, send a first instruction to the first device, --.

Column 36, Claim 20, Line 50:
Currently reads: "interior send a first instruction to the first device,"
Where it should read: -- interior, send a first instruction to the first device, --.

Signed and Sealed this
Twenty-third Day of May, 2023

Katherine Kelly Vidal
*Director of the United States Patent and Trademark Office*